United States Patent [19]
Sugasawa

[11] Patent Number: 4,749,210
[45] Date of Patent: Jun. 7, 1988

[54] AUTOMOTIVE SUSPENSION CONTROL SYSTEM WITH MANUALLY ADJUSTABLE SUSPENSION CHARACTERISTICS AND/OR SUSPENSION CONTROL CHARACTERISTICS

[75] Inventor: Fukashi Sugasawa, Kanagawa, Japan

[73] Assignee: Nissan Motor Company, Limited, Kanagawa, Japan

[21] Appl. No.: 911,787

[22] Filed: Sep. 26, 1986

[30] Foreign Application Priority Data

Sep. 27, 1985 [JP] Japan .................. 60-214223

[51] Int. Cl.$^4$ .............................................. B60G 11/26
[52] U.S. Cl. ................................................... 280/707
[58] Field of Search .............. 280/707, 6 R, 6 M, 708, 280/DIG. 1; 267/64.22, 64.16

[56] References Cited

U.S. PATENT DOCUMENTS 4,364,574 12/1982 Saito .................................... 280/707
4,579,366 4/1986 Doi et al. ............................ 280/707

FOREIGN PATENT DOCUMENTS 60-151111 9/1985 Japan .

OTHER PUBLICATIONS

Journal of the Society of Automotive Engineers of Japan, vol. 39, pp. 198-220, 1985.

Primary Examiner—Kenneth R. Rice
Attorney, Agent, or Firm—Foley & Lardner, Schwartz, Jeffery, Schwaab, Mack, Blumenthal & Evans

[57] ABSTRACT

A suspension control system has a manual operator which is manually accessible is provided for adjusting suspension control characteristics depending upon the driver's tastes or depending upon the vehicle condition. The adjustment of the suspension control characteristics can take place with respect to each of a plurality of suspension control items, such as roll-suppressive suspension control, anti-dive suspension control, anti-scout suspension control, road roughness dependent suspension control, bottoming control and so forth. By allowing adjustment of the suspension control characteristics with respect to each control item independently of that with respect to other control items, the suspension control characteristics of the overall suspension control system can be precisely fit the driver's feeling and/or precisely adapted to the vehicle condition.

12 Claims, 11 Drawing Sheets

AUTOMOTIVE SUSPENSION CONTROL SYSTEM WITH MANUALLY ADJUSTABLE SUSPENSION CHARACTERISTICS AND/OR SUSPENSION CONTROL CHARACTERISTICS

BACKGROUND OF THE INVENTION

1. Field of the Invention

The present invention relates generally to an automotive suspension control system for adjusting suspension characteristincs, such as shock absorbing characteristics, spring characteristics, roll-stabilizer stiffness and so forth. More specifically, the invention relates to a suspension control system having adjustable suspension characteristics and/or suspension control characteristics so as to fit the vehicular motion to a driver's feeling. Further, the invention relates to a suspension control system which allows a driver to select desired suspension control characteristics and/or suspension chracteristics.

2. Description of the Prior Art

Recently, suspension control systems controlling the performance of vehicular suspension systems have been used to provide better riding comfort and better vehicle driving ability. Such suspension control systems control the damping characteristics or shock absorbing characteristics of the vehicular suspension system depending upon various vehicle driving parameters affecting riding comfort and drivability of the vehicle. For example, suspension control systems may adjust suspension characteristics depending upon road condition, vehicle speed, acceleration and deceleration of the vehicle, vehicular roll and so forth. In order to obtain desired suspension control characteristics, the suspension control system receives preselected vehicle driving parameters, compares a value representative of the preselected vehicle driving parameters with a corresponding reference value and adjusts suspension characteristics accordingly.

For example, the co-pending U.S. Patent Application Ser. No. 678,806 filed on Dec. 6, 1984, the corresponding European Patent Application of which has been published as First Publication No. 01 45 013, discloses a vehicular roll suppressive suspension control system, which invention has been assigned to the assignee of the present invention. In the disclosed system, the stiffness of a vehicular suspension system is selected in accordance with vehicle speed and the rate of steering adjustment, which influence the centrifugal force on a turning vehicle. Shock absorbers in the suspension system can operate in either high or low damping force modes. Vehicle speed and steering wheel position are monitored, and the latter property is checked periodically to derive a measure of steering wheel acceleration. When steering wheel acceleration, i.e. the second derivative of the steering angle with respect to time, exceeds a threshold value, then shock absorbers are operated in the high damping force mode; otherwise, they operate in the low damping force mode. The threshold value to which the steering wheel acceleration value is compared is derived as a function of vehicle speed.

On the other hand, the co-pending U.S. Patent Application Ser. No. 649,484, filed on Sept. 11, 1984, the corresponding European Patent Application of which has been published as First Publication No. 01 35 902, discloses a nose-dive suppressive suspension control system, which invention is also assigned to the assignee of the present invention. In the disclosed system, an automotive vehicle suspension has a damper with variable damping characteristics, specifically adjustable damping force. A controller responds to application and release of vehicle brakes by increasing the damping force. Increasing the damping force at the beginning of braking suppresses nose-dive of the vehicle. On the other hand, increasing the damping force at the end of braking suppresses pitching motion of the vehicle. This greatly improves the behavior of the vehicle sprung mass during braking. A similar nose dive suppressive suspension control system active in response to braking of the vehicle has been disclosed in the Japanese Patent First Publication (Tokkai) Showa 60-148710, published on Aug. 6, 1985. Furthermore, the co-pending U.S. Patent Application Ser. No. 744,380, filed on June 13, 1985, which has been assigned to the assignee of the present invention, discloses a suspension control system which can precisely control the damping characteristics of vehicular suspensions in order to successfully and satisfactorily prevent dive and rebound. The suspension control system is designed to detect vehicle deceleration on the basis of variations in vehicle speed and to compare the vehicle speed with a predetermined vehicle speed criterion across which damping characteristics of the vehicular suspension varies between harder suspension mode and softer suspension mode. The vehicle speed criterion varies with vehicle deceleration so that the criterion becomes higher when deceleration is greater than a predetermined level. By hardening the suspension earlier during relatively abrupt deceleration of the vehicle, the intensity of nose dive is reduced and thus the intensity of rebounding motion after nose-dive can be reduced. This ensures riding comfort by reducing the intensity of pitching behavior of the vehicle front end. On the other hand, by delaying the hardening of the suspension during gentle deceleration of the vehicle, softer damping characteristics can be maintained for a longer period to ensure riding comfort by successfully absorbing bounding and rebounding shocks from the road surface.

A similar acceleration and deceleration dependent suspension control system has been disclosed in the Japanese Patent First Publication (Tokkai) Showa No. 60-154906, published on Aug. 14, 1985. Vehicular acceleration and deceleration are detected based on fuel supply control pulse width or fuel injection pulse width, which is taken as an engine speed indicative parameter, and vehicle speed.

The co-pending U.S. Patent Application Ser. No. 744,379, filed on June 13, 1985, corresponding European Patent Application of which has been published as the First Publication No. 01 67 159, discloses a suspension control system which is variable of damping characteristics of the suspension depending upon road surface condition and which has been assigned to the common assignee to the present invention. In the disclosure, the suspension control system includes a road surface sensor which produces a road condition indicative signal. A controller detects bounding and rebounding motions of the vehicle suspension on the basis of the road condition indicative signal from the road sensor. The controller monitors when the bounding and rebounding motion exceeds a predetermined level and when its frequency falls within a given frequency range. These conditions reflect typical vehicle body behavior during travel along an undulating road, in which case, the controller produces a control signal to stiffen the suspension system. This suppresses pitching motion of the vehicle on an undulating road so as to satisfactorily and successfully provide good riding comfort.

Furthermore, the assignee of the present invention also assigned the U.S. Pat. No. 4,600,215, issued on July 15, 1986. The invention disclosed in this U.S. Patent adjusts suspension control characteristics relative to road surface condition depending upon vehicle speed. For instance, a suspension control system for automotive vehicles automatically adjusts the damping strength of variable shock absorbers or other dampers in accordance with road surface conditions. The sensor signal reflects vertical displacement of the vehicle body from the road surface. The sensor signal is compared to a corresponding reference level which is variable depending upon a vehicle speed. The results of comparison give an indication of the degree and scale of irregularities in the road surface. The comparison information is sent to a suspension system controller which causes actuation of the shock absorbers or other dampers to a stiffer mode of operation when road surface roughness requiring harder suspension is recognized.

In addition, the co-pending U.S. Patent Application Ser. No. 771,776, filed on Sept. 6, 1985, discloses a suspension control system which includes a suspension system variable of stiffness and/or damping characteristics, a road sensor producing a road condition indicative signal and a controller for controlling the stiffness and/or damping characteristics of the suspension system depending upon the road condition indicative signal value and the vehicle speed indicative signal value. The controller detects the vehicle speed in a predetermined normal speed range which is defined by a lower speed criteria and an upper speed criteria, for generally maintaining the stiffness or damping characteristics of the suspension in a relatively soft state. The controller detects the vehicle speed indicative signal value being smaller than the foregoing lower speed criteria to increase sensitivity of the road sensor and/or harden the suspension system to a harder level than that in the normal speed range when the roughness of the road surface is beyond a rough road criteria. Also, the controller detects the vehicle speed indicative signal value being greater than the upper speed criteria to increase sensitivity of the road sensor and/or harden the suspension system to a harder level than that in the normal speed range when the roughness of the road surface is beyond a rough road criteria.

Furthermore, another automotive suspension control system has been disclosed in AUTOMOTIVE TECHNOLOGY (Jidosha Gijutsu) page 199 to 203, vol 39, No. 2, 1985, published on Feb. 1, 1985. The suspension control system disclosed in this publication provides manual selection of suspension control modes for selecting damping characteristics of a shock absorber among NORMAL (SOFT) mode, SPORT (MEDIUM) and HARD modes. Manual selection is performed between NORMAL selector mode for selecting NORMAL mode of the shock absorber, SPORT selector for selecting SPORT mode of the shock absorber, HARD selector mode for selecting HARD mode of the shock abosrber, NORMAL-AUTO selector mode for selecting NORMAL or SPORT mode at relatively low vehicle speed and selecting SPORT or HARD mode at relatively highe vehicle speed, and SPORT-AUTO selector mode for selecting SPORT mode or HARD mode in all ranges of the vehicle speed.

Such prior proposed suspension control systems are intended to achieve both driving comfort and driving stability at a higher level in order to fit the vehicle driving feeling to the drivers' feeling. Those suspension control systems indeed achieve such objects and successful in providing adjustment of the suspension characteristics depending upon the vehicle driving condition.

However, the drivers tend to require further precisely adjustable suspension control systems. Namely, for example, some drivers will prefer to have higher roll/pitch stability and other drivers may prefer softer suspension characteristics in any driving condition. The prior proposed suspension systems do not at all satisfy such requirements of the drivers.

SUMMARY OF THE INVENTION

Therefore, it is an object of the present invention is to provide a suspension control system for an automotive suspension control system, which allows adjustment of suspension characteristics or suspension control characteristics more precisely fitting the individual driver's feeling.

Another and more specific object of the present invention is to provide an automotive suspension system which allows manual adjustment of the suspension characteristics and/or suspension control characteristics for the vehicular driver.

A further object of the invention is to provide an automotive suspension control system which provides variable of sensitivity variation in a preselected suspension control parameter for adjusting stiffness of the suspension system.

A still further object of the invention is to provide an automotive suspension control system which allows manual adjustment of the sensitivity of variation of the suspension control parameter.

In order to accomplish the above-mentioned and other objects, a suspension control system, according to the present invention, a manual operator which is manually accessible is provided for adjusting suspension control characteristics depending upon the driver's preference or depending upon the vehicle condition.

The adjustment of the suspension control characteristics can accomplish with respect to each of a plurality of suspension control items, such as roll-suppressive suspension control, anti-dive suspension control, anti-squat suspension control, road roughness dependent suspension control, bottoming control and so forth. By allowing adjustment of the suspension control characteristics with respect to each control item independently of that with respect to other control items, the suspension control characteristics of the overall suspension control system can be precisely fit to the driver's feeling and/or precisely adapted to the vehicle condition.

DESCRIPTION OF THE PREFERRED EMBODIMENTS

Figure 1:
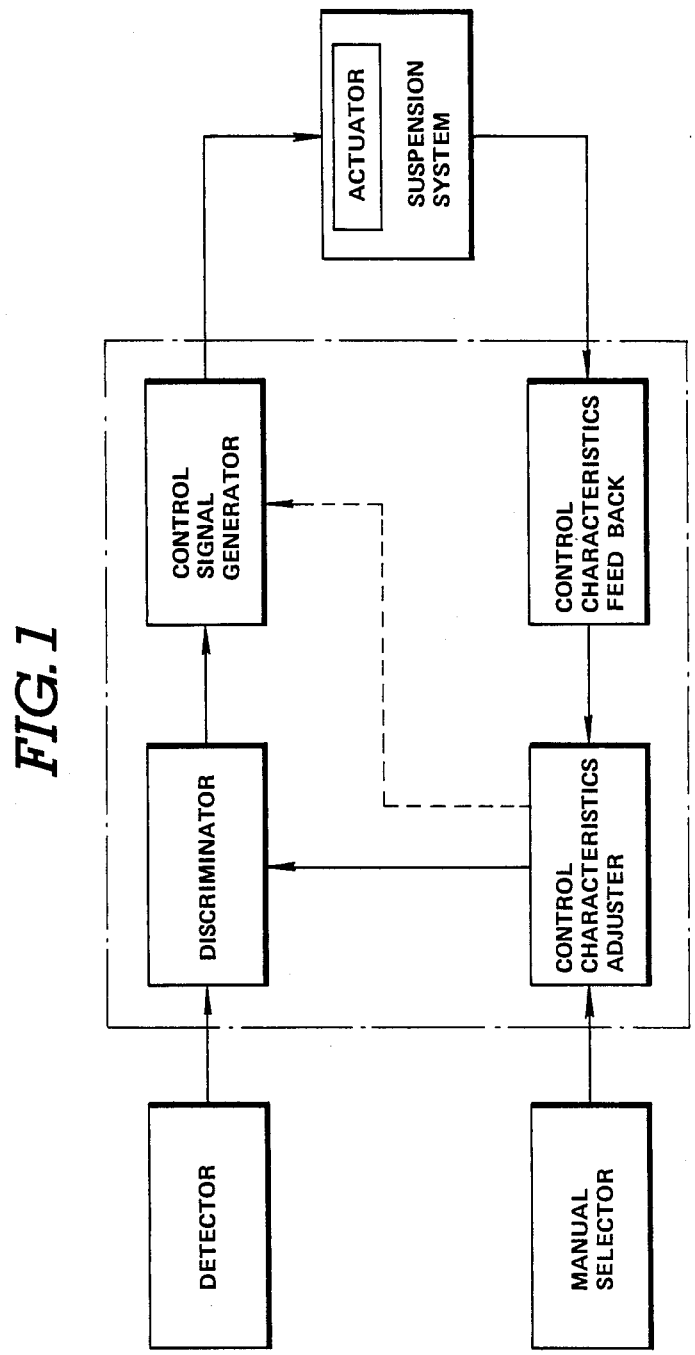
FIG. 1 is a schematic block diagram showing general and fundamental concept of the preferred embodiments of a suspension control system according to the present invention.

Referring now to the drawings, FIG. 1 shows the general construction of a suspension control system according to the present invention in order to discuss the fundamental idea of the invention. The suspension control system performs anti-roll suspension control, anti-dive suspension control, vehicle speed-dependent suspension control, bump-responsive suspension control, road roughness-dependent suspension control, bottoming responsive suspension control and so forth. In order to perform at least one of above-listed suspension controls, at least one suspension control parameter, such as steering angular displacement, braking condition, acceleration and deceleration of the vehicle, vehicle speed, road condition and so forth has to be detected. Therefore, a detector means for detecting at least one of the suspension control parameters is provided in the suspension control system. The detector detects the suspension control parameter and produces a detector signal. The detector signal is fed to a controller. The controller has a discriminator stage for processing the detector signal to detect the vehicle driving condition according to predetermined suspension control characteristics and produce a vehicle driving condition indicative signal.

The control system according to the present invention also has a manual selector means for manually selecting desired suspension control characteristics to be used in the discriminator. In order to modify the suspension control characteristics, the controller includes a control characteristics selecting stage. The control characteristics selecting stage is responsive to manual input of the demand for modification or adjustment of the control characteristics to select desired suspension control characteristics for producing a selected control characteristics indicative signal. The control characteristics indicative signal is fed to the discriminator to be used in discriminator operations set forth above.

The controller is further provided with a control signal generator stage connected to the discriminator to receive the vehicle driving condition indicative signal therefrom. Based on the vehicle driving condition indicative signal from the discriminator, the control signal is generated in the control signal generator stage. The control signal is fed to a driver circuit. The driver circuit is responsive to the control signal to actuate an actuator in a suspension system for adjusting the suspension characteristics according to the control signal.

In practice, the actuator controls the suspension characteristics of the suspension system at least between a HARD mode and SOFT mode. In the HARD mode, stiffness of the suspension system is higher than that in the SOFT mode.

It should be noted that the wording "suspension control characteristics" or "control characteristics" represents a schedule of adjustment of the suspension characteristics, HARD/SOFT suspension characteristics criteria to be compared with the driving condition indicative signal value and others, for example. Also, the "adjustment of the suspension control characteristics" means changing of the schedule for changing over the suspension characteristics. In a practical embodiment, adjustment of the suspension control characteristics is carried out by adjusting sensing ability of the vehicle driving condition for adjusting suspension characteristics between HARD mode and SOFT modes. It should be further noted that, the wording "suspension characteristics" used throughout the disclosure and the appended claims represents damping characteristics of a damper, such as a hydraulic shock absorber, pneumatic shock absorber and so forth, roll-stabilizing characteristics of a roll-stabilizer, the spring characteristics of suspension spring, such as a pneumatic spring and so forth. Therefore, the wording "adjustment of suspension characteristic" represents adjustment or variation of any one of the damping characteristics, roll-stabilizing characteristics and spring characteristics. Furthermore, the wordings "HARD suspension characteristics" and "SOFT suspension characteristics" represent the condition of suspension as detailed below:

the damper is set in "HARD damping characteristics mode" to produce a greater damping force than in "SOFT damping characteristics mode" to which the damper is set under conditions where the SOFT suspension characteristics are ordered;

the roll-stabilizer is set in "HARD stabilizer characteristics mode" to produce a greater torsional modulus than in "SOFT stabilizer characteristics mode" to which the roll-stabilizer is set under conditions where the SOFT suspension characteristics are ordered; and-/or the suspension spring is set in "HARD spring characteristics mode" to produce a greater spring force than in "SOFT spring characteristics mode" to which the suspension spring is set under conditions where the SOFT suspension characteristics are ordered.

It should be further noted that the suspension characteristics can be adjusting one of the damping characteristics, roll-stabilizing characteristics and the spring characteristics or adjusting two or more of them in combination.

The preferred embodiments of the suspension control system according to the present invention will be described in detail with reference to FIGS. 2 to 19.

Figure 2:
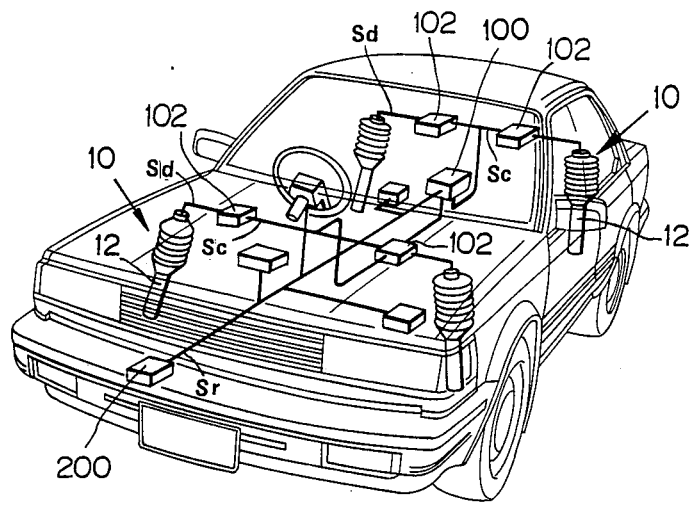
FIG. 2 is a perspective illustration showing an automotive vehicle employing a suspension control system according to the present invention.
Figure 3:
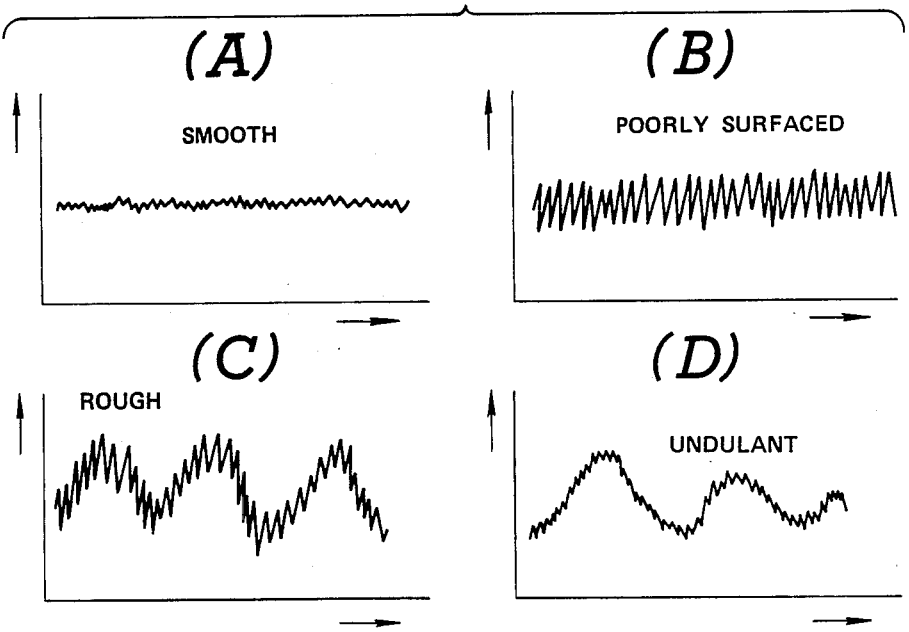
FIGS. 3(A) to 3(D) show examples of road sensor signal characteristics of distinct road surface condition.
Figure 4:
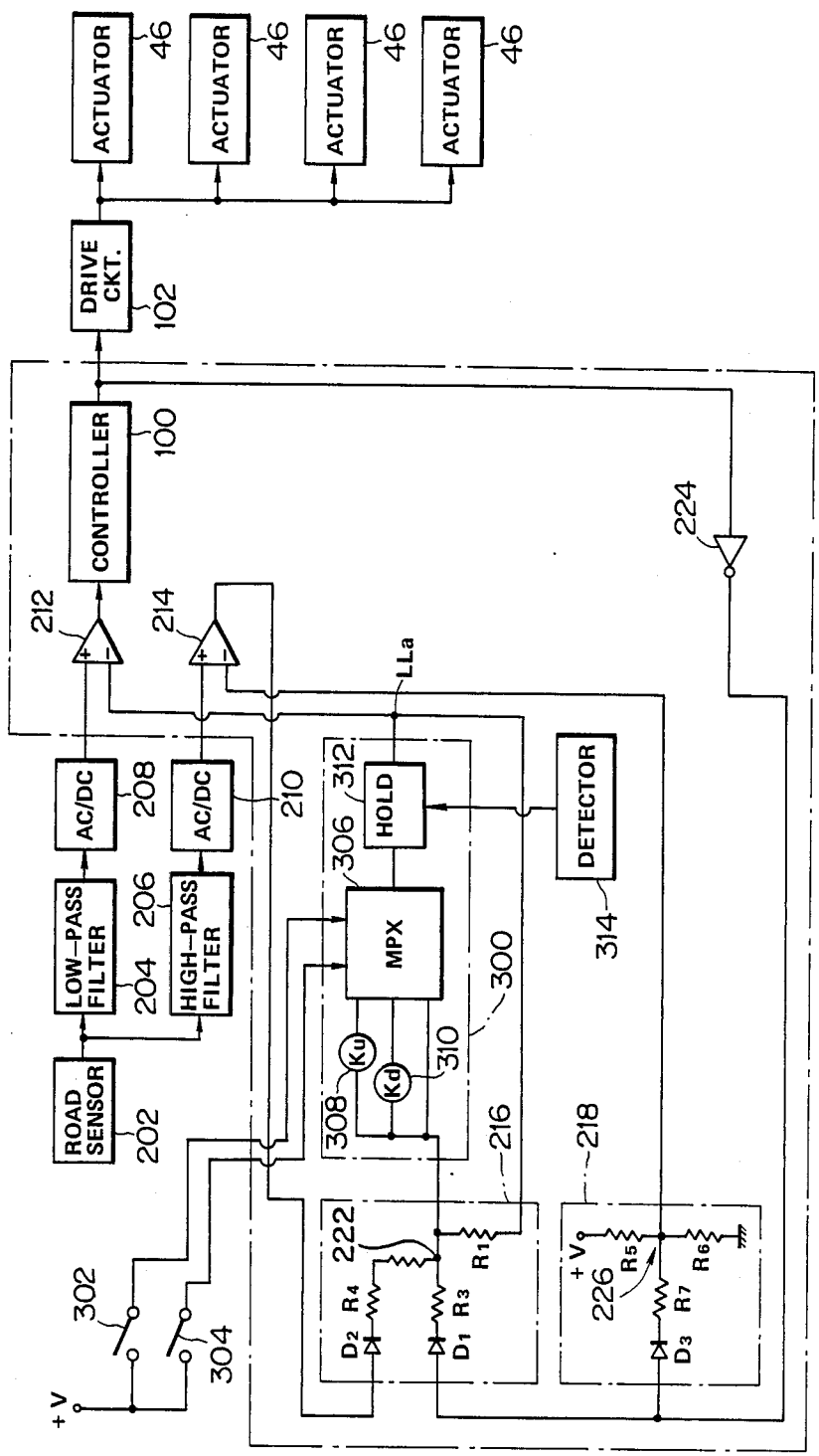
FIG. 4 is a circuit diagram showing the first embodiment of the suspension control system according to the present invention.

FIGS. 2 to 4 show the preferred embodiment of an electronic suspension control system in accordance with the present invention. In this embodiment, the suspension control system generally comprises suspension strut assemblies 10, each including a shock absorber 12 with variable shock-absorbing characteristics and a controller 100 adapted to produce a control signal for actuating an actuator (not shown in FIG. 2) in each shock absorber 12 in order to the adjust the shock-absorbing characteristics in accordance with the vehicle driving condition.

It should be appreciated that the term "shock-absorbing characteristics" used throughout the disclosure is one of the suspension characteristics adjusted by means of variable damping force shock absorber and refers to the quantitative degree to which a shock absorber produces damping force or spring force against bounding and rebounding motion of the vehicle body as a sprung mass and the road wheel assembly as unsprung mass, and pitching and rolling movement of the vehicle body relative to the road wheel assembly. In practice, the shock-absorbing characteristics can be controlled in various ways based on flow restriction between shock absorber working chambers disposed in shock absorber cylinders. In the shown embodiment, the flow restriction is variable by means of a flow control valve disposed within a reciprocable piston separating the chambers. The preferred embodiment described herebelow employs a shock absorber with two-way variable shock-absorbing characteristics, i.e. HARD mode and SOFT mode. Obviously, in HARD mode, the damping force generated in response to bounding or rebounding shock applied to the vehicle is greater than in SOFT mode. Hoever, the shown embodiment is to be considered merely as an example for facilitating better understanding of the invention and simplification of the disclosure. In fact, shock absorbers which operate in three modes, i.e. HARD mode, SOFT mode and INTERMEDIATE or MEDIUM mode, are also applicable to the preferred embodiment of the suspension control system according to the invention. Some possible modifications to the shock absorber will be disclosed together with the preferred shock absorber design given later.

Returning to FIG. 2, the controller 100 is connected to a road surface sensor 202 which produces a sensor signal $S_r$ indicative of road surface conditions, which will be referred to hereinafter as "road sensor signal $S_r$". The controller 100 may also be connected to sensors, such as a vehicle speed sensor, a brake switch, etc., in order to receive the sensor signals indicative of the suspension control parameters. The controller 100 is, in turn, connected to driver signal generators 102 which are responsive to the control signal from the controller, which control signal $S_c$ can assume either of two states, namely HIGH and LOW. The driver signal generator 102 produces a drive signal $S_d$ which actuates the shock bsorber to one of the HARD and SOFT modes.

The controller 100 is responsive to the road sensor signal $S_r$ to produce a control signal $S_c$ for switching the shock absorber between HARD mode and SOFT mode. The general concepts of road surface-dependent suspension control will be described herebelow with respect to FIGS. 3(A) to 3(D). FIG. 3(A) shows the waveform of the road sensor signal $S_r$ as the vehicle travels over a relatively smooth road. FIG. 3(B) shows a waveform of the road sensor signal as the vehicle moves along a graded but poorly surfaced road, such as a gravel road. FIG. 3(C) shows the waveform of the road sensor signal as the vehicle travels along a very rough road. FIG. 3(D) shows the waveform of the road sensor signal as the vehicle travels along an undulant but well-surfaced road.

Generally speaking, softer or lower damping-force characteristics are preferable from the standpoint of good driving comfort. Thus, when travelling along a relatively smooth road, the SOFT mode of the shock absorber is preferable. In addition, in order to absorb relatively high-frequency vibrations caused by an uneven road surface, a SOFT suspension is preferred. On the other hand, when the vehicle is travelling on a relatively rough or undulant road, the vehicle body may tend to bounce due to abrupt vertical displacements. In this case, pitch suppression becomes the most important factor for riding comfort and driving stability.

It should be apparent that as the road wheel vibrates due to a rough road surface, it generates high-frequency components in the road sensor signal. On the other hand, large-scale vehicle body vibrations as in lateral rolling or vertical pitching motions are reflected in the low-frequency components of the road sensor signal. Therefore, in the shown system, the road surface conditions, whether a relatively smooth road (A), an uneven road (B), a relatively rough road (C) or an undulant (D), can be recognized by separately monitoring the high- and low-frequency components of the road sensor signals.

FIGS. 2 to 4 show the first preferred embodiment of the suspension control system according to the present invention. FIG. 4 shows the circuit layout of the first embodiment of the suspension control system of the invention. The road sensor 202 is designed for detecting relative displacement between the vehicle body and wheel axle. In the shown embodiment, the road sensor comprises a kind of potentiometer producing a road sensor signal $S_r$ having a value variable depending upon the relative distance between the vehicle body and the wheel axle. Additionally, in the preferred embodiment, the road sensor 202 is mounted adjacent the front-left wheel suspension system for monitoring relative displacement between the vehicle body and the wheel axle of the front-left wheel.

Figure 5:
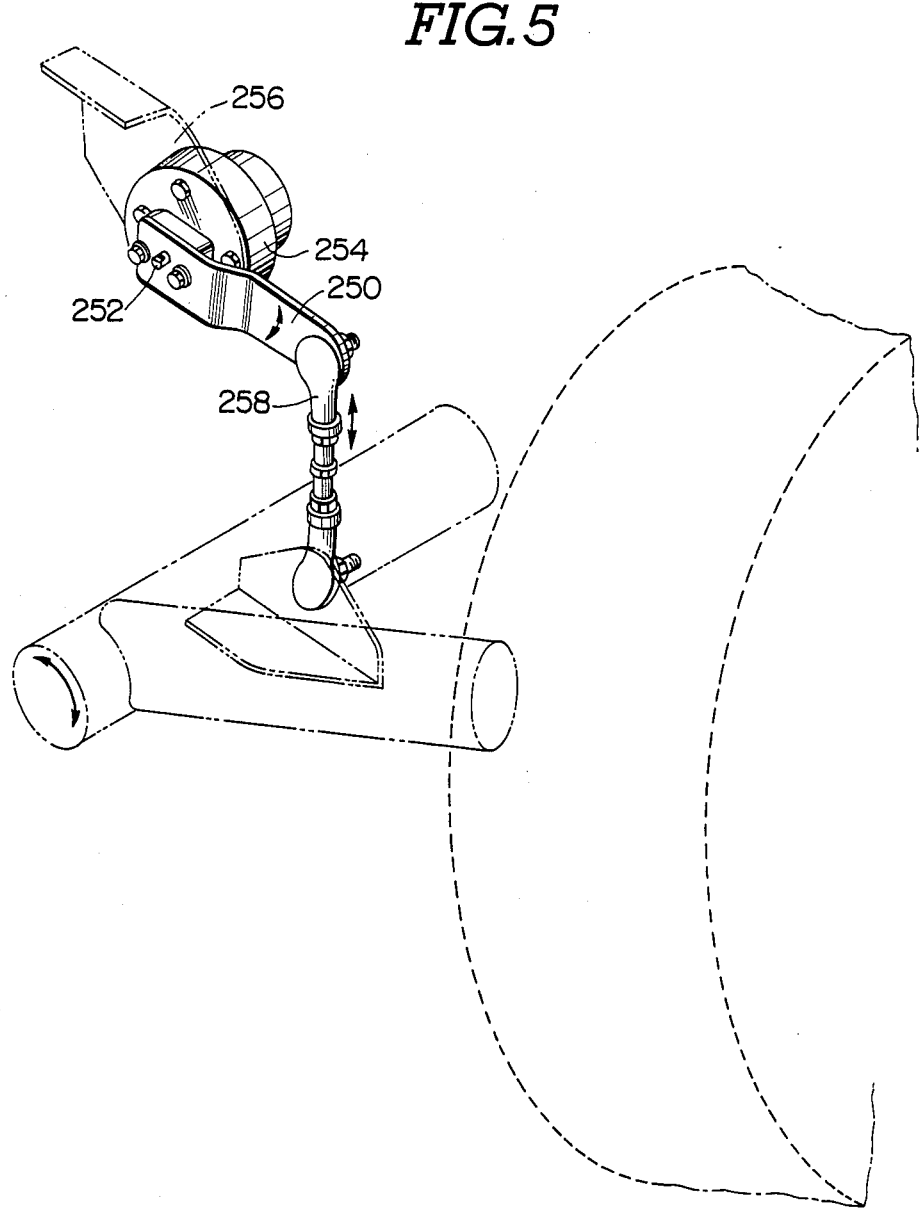
FIG. 5 is a perspective view of the preferred embodiment of a road sensor which comprises a kind of potentiometer, to be employed in the first embodiment of the suspension control system of FIG. 4.

FIG. 5 shows the preferred embodiment of the road sensor 16 to be employed in the suspension control system according to the invention of FIGS. 1 to 3. As shown in FIG. 5, the road sensor 16 has a pivotal lever 250 fixed to a rotary shaft 252. The rotary shaft 252 extends into a sensor housing 254. The sensor housing 254 is fixed to the vehicle body by means of a mounting bracket 256. A rotary element (not shown) which constitutes the moving component of a conventional potentiometer, is housed within the sensor housing 254 and fixed to the rotary shaft 252 for rotation therewith. In the preferred embodiment, the pivotal lever 250 is free to pivot through an angular range of 45° to either side of its neutral position. The output voltage of the potentiometer housed within the sensor housing increases and decreases with the angular position of the pivotal lever 250. In practice, the potentiometer is adjusted so as to output zero volts while the pivotal lever 250 is its neutral position. The output voltage of the potentiometer increases linearly as it pivots upward and decreases linearly as it pivots downward.

A linkage 258 is connected to the free end of the pivotal level 250 at its upper end. The lower end of the linkage 258 is connected to a wheel asembly, such as a suspension arm, a suspension link and so forth. Depending upon the displacement of the wheel assembly relative to the vehicle body in bounding and rebounding direction, the pivotal lever 250 is driven up and down.

Therefore, the relative displacement between the vehicle body and the wheel assembly is converted into rotation or pivotal movement of the potentiometer and then converted into electric voltage which serves as the road condition indicative signal.

In practice, the road sensor 16 cooperates with one of the front wheels to monitor the relative displacement between the vehicle body and the associated front wheel assembly. Preferably, the road sensor 16 is associated with the front left wheel to monitor the relative displacement between the vehicle body and the front left wheel assembly.

In the alternative embodiment, an ultra-sonic sensor 202 can be utilized as the road sensor 202. In such case, the ultra-sonic road sensor will be mounted on the vehicle body adjacent the front end of the vehicle. A pair of band-pass filters 204 and 206 are connected to the road sensor 202. The band-pass filters 204 and 206 are connected to the controller 100 via respectively associated AC-to-DC (Ac/DC) converters 208 and 210 and comparators 212 and 214. The band-pass filter 204 serves as low-pass filter for filting the high-frequency components out of the output signal of the road sensor 202 in order to pick up only the low-frequency components, as shown in FIG. 6(B). The frequency range to pass the low-pass filter 204 is selected in a frequency range corresponding to vehicle body oscillation or vibration in bonding and rebounding motion. The low-pass filter 204 is connected to the AC-DC converter 208. The AC-DC converter 208 converts the output signal of the low-pass filter in a form of alternating current into direct current signal indicative of the amplitude of the low-frequency components of the road output signal, as shown in FIG. 6(D). The AC-DC converter 208 is connected for output to the non-inverting input terminal of the comparator 212. Similarly, the band-pass filter 206 is adapted to filter the low-frequency components out of the road sensor output signal so as to pick up only the high-frequency components as shown in FIG. 6(C). The pass-band of the band-pass filter 206 is selected to pass only the signal component in a frequency range corresponding to the vehicle wheel vibration frequency range. The output signal of the high-pass filter 206 is fed to the AC-DC converter 210. The AC-DC converter 210 produces a direct-current signal shown in FIG. 6(E) indicative of the amplitude of the high-frequency components of the road sensor output signal. The direct current level signal output from the AC-DC converter 210 is applied to the comparator 214 through its the non-inverting input terminal.

The inverting input terminals of the comparators 212 and 214 receive inputs from reference signal generators 216 and 218 respectively. The reference signal generator 216 is connected to the inverting input terminal of the comparator 212. On the other hand, the reference signal generator 216 is connected to the output terminal of the comparator 214 via a diode $D_2$ and a resistor $R_4$. The reference signal generator 216 is also connected to the controller 100 via an inverter 224, a diode $D_1$ and a resistor $R_3$ for purposes discussed later. With this arrangement, the signal level D of the reference signal produced by the reference signal generator 216 varies depending upon the output of the comparator 214 and the signal level C of control signal $S_c$ from the controller. In practice, the refereance signal level of the reference signal generator 216 can be obtained from the following equation:

$$A = A_0 - \alpha_1 \times C + \alpha_2 \times D + LL_a \times \alpha_3 \qquad (1)$$

where
  A is signal level of the reference signal of the reference signal generator 216;
  $A_0$ is source voltage determined by the voltage divider constituted by the resistors $R_3$ and $R_4$;
  $\alpha_1$ is a constant determined by resistance value of the resistor $R_3$;
  $\alpha_2$ is a constant determined by resistance value of the resistor $R_4$.
  C is a binary value determined by the control signal $S_c$;
  D is a binary value determined by the output of the comparator 214.
  $LL_a$ is an output of the reference signal level adjusting circuit 300; and
  $\alpha_3$ is a constant determined by resistance value of the resistor $R_1$.

Similarly, the reference signal generator 218 has a voltage divider 226 consisting of a pair of resistors $R_5$ and $R_6$. A junction 228 between the resistors $R_5$ and $R_6$ is connected to the inverting input terminal of the comparator 216. In addition, the junction 228 is connected to the controller 100 via the inverter 224, a diode $D_3$ and a resistor $R_7$. With this arrangement, the signal level of the reference signal produced by the reference signal generator 218 varies depending upon the signal level of the control signal from the controller 100. In practice, the signal level of the reference signal of the reference signal generator 218 can be obtained from the following equation:

$$B = B_0 - \beta \times C \qquad (2)$$

where
  B is the signal level of the reference signal of the reference signal generator 218;
  $B_0$ is the source voltage determined by voltage divider 226;
  $\beta$ is a constant determined by the resistance value of the resistor $R_7$; and
  C is a binary value determined by the control signal $S_c$.

The controller 100 is connected for input from the output terminal of the comparator 212 and outputs a control signal value at either a HIGH level, by which the shock absorber is shifted to HARD mode or at a LOW level shifting the shock absorber to the SOFT mode.

A reference signal level adjusting circuit 300 is connected to the reference signal generator 216. The reference signal level adjusting circuit 300 is, in turn, connected to a sensing ability up-switch 302 and a sensing ability down-switch 304. The up-switch 302 and down-switch 304 are manually operable for adjusting the signal level of the reference signal to be produced by the reference signal generator 216. Also, the reference signal level adjusting circuit 300 is connected to a detector 306 which detects the vehicle driving distance and/or vehicle driving time exceeding a predetermined distance or a predetermined time.

As shown in FIG. 4, the reference signal level adjusting circuit 300 includes an up-coefficient generator circuit 308 which produces an up-coefficient (Ku<1) indicative signal and a down-coefficient generator circuit 310 which produces a down-coefficient (Kd>1) indicative signal. The reference signal level adjusting circuit 300 further includes a multiplexer 312. The multiplexer 312 is connected to the up-coefficient generator 308, the down-coefficient generator 310 and the reference signal generator 216. On the other hand, the multiplexer 312 is connected to a hold circuit 314 for selectively feeding one of outputs of the up-coefficient generator 308, the down-coefficient generator 310 and the reference signal generator 216. The up-coefficient generator 308 multiplies the reference signal value with the preset coefficient Ku and thus feeds a reduced level of the reference signal to the multiplexer 312. On the other hand, the down-coefficient generator 310 multiplies the reference signal from the reference generator 216 with the preset coefficient Kd and thus feeds an increased level of the reference signal to the multiplexer 312.

The multiplexer 312 normally selects the direct input from the reference signal generator 216 to pass the non-modified reference signal to the hold circuit 314. The multiplexer 312 is responsive to closing of the up-switch to select the reduced level of the reference signal output from the up-coefficient generator 308. On the other hand, the multiplexer 312 is responsive to the down-switch 304 to select the increased level of the reference signal output from the down-coefficient generator 310.

The hold circuit 314 is activated by the detector signal from the detector 306 to update the held value with the input from the multiplexer 312. The output terminal of the hold circuit 314 is connected to the inverting input terminal of the comparator 212. Also, the output terminal of the hold circuit 314 is connected to the resistor $R_3$ in the reference signal generator 216 through a resistor $R_1$.

FIG. 4 shows the controller 100 which generally comprises a microprocessor. In practice, the microprocessor performs control operations not only depending upon the road surface conditions but also depending upon vehicle speed, other vehicle driving conditions, such as vehicle acceleration, and other preselected suspension control parameters. One of these suspension control parameters, is the HIGH- or LOW-level output signal from the comparator 214, which switch the damping characteristics of the shock absorber between the HARD and SOFT modes respectively.

The microprocessor 100 generally comprises an input interface 102, CPU 104, RAM 106, ROM 108 and output interface 110. In the shown embodiment, the microproccessor 100 is connected to the road sensor 200 via the input interface 102. The microprocessor 100 is also connected for input from a clock generator 112. RAM 106 includes a memory block 114 serving as a mode-indicative flag $F_{DH}$ which is set while the shock absorber is operating in HARD mode. ROM 108 includes a memory block 116 holding the road surface-dependent suspension control program as an interrupt program triggered by a HIGH-level signal from the comparator 214. ROM 108 also has a memory block 118 storing a road sensor control program which triggers the road sensor at a given timing. The output interface 110 of the microprocessor 100 is connected for output of control signal $S_c$ to each of the driver signal generators.

Figure 6:
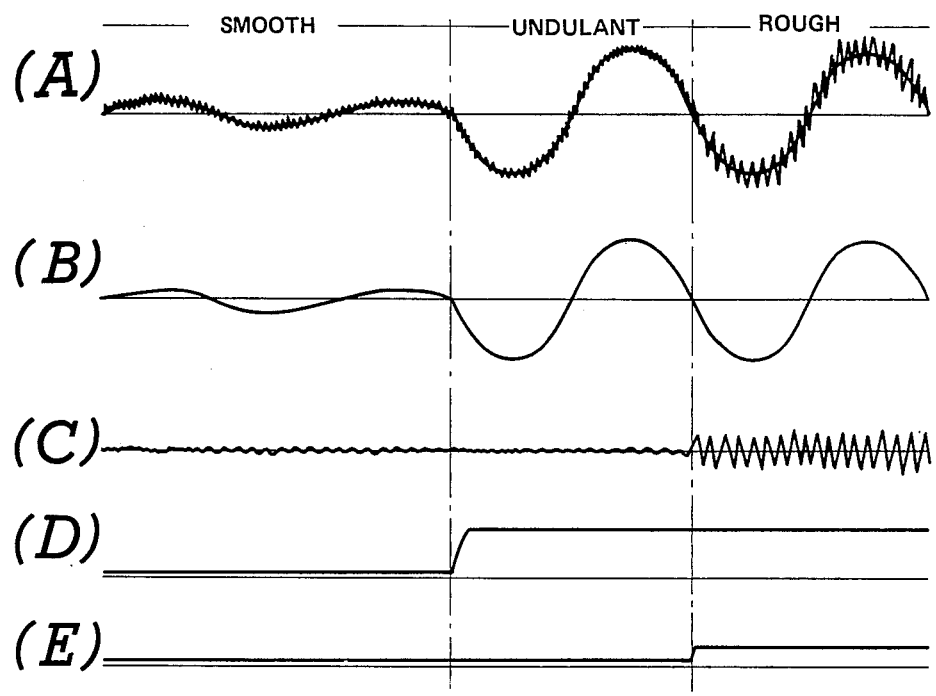
FIGS. 6(A) to 6(E) ar timing charts showing some typical waveforms appearing in the circuitry of FIG. 4.

The general control operation of the suspension control system as set forth above will be at first described with reference to FIGS. 6 to 8, with respect to the condition where the up-switch 302 and the down-switch 304 are not operated. Since the up-switch 302 and the down-switch 304 are not depressed, the multiplexer 312 directly connects the reference signal generator 216 to the hold circuit 314. Therefore, the hold circuit 314 holds the reference signal output from the reference signal generator 216.

As the vehicle travels over a relatively smooth road as illustrated by the zone labelled "SMOOTH" in FIG. 6(A), the output signal of the road sensor 202 is rather smooth and amplitudes of both the high- and low-frequency components small and regular. The output of the road sensor 202 is filtered by the low-pass filter 204 and the high-pass filter 206 as respectively illustrated in FIGS. 6(B) and 6(C). Therefore, the output levels of the AC-DC converters 208 and 210 remain LOW, as shown in FIGS. 6(D) and 6(E). The outputs of the AC-DC converters 208 and 210 are respectively input to the non-inverting input terminals of the comparators 212 and 214.

At this time, since the signal level of the control signal issued by the controller 100 remains LOW, as will become obvious later, the logical value of the output of the inverter 224 become "1" (HIGH). The diodes $D_1$ and $D_3$ are thus non-conductive. As a result, current flowing through the resistors $R_3$ and $R_7$ drops to zero. Therefore, the potential at the junction 226 rises into correspondence with the divided power source voltage $B_0$ (See equation 2). As shown in FIG. 8, at this condition, the reference signal level HL to be applied to the inverting input terminal of the comparator 214 therefore becomes higher a level. As a result, the logical value of the output of the comparator 214 remains "0" (LOW).

Figure 7:
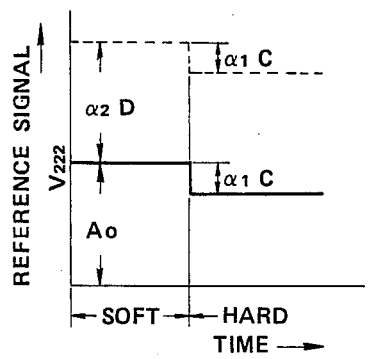
FIG. 7 is a diagram of the possible states of a low-frequency reference signal.
Figure 8:
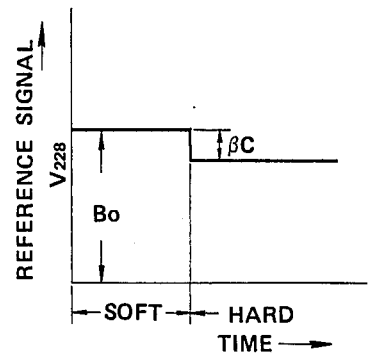
FIG. 8 is a diagram of the possible states of a high-frequency reference signal.

Since, the diode $D_1$ is cut off to block current flow through the resistor $R_3$ and the logical value of the output of the comparator 214 remains "0", the potential at the junction 222 corresponds to the power source voltage as divided by the voltage divider comprising resistors $R_3$ and $R_4$, i.e. $A_0$, as shown by the solid line in FIG. 7. At this time, since the amplitude of the low-frequency component of the output of the road sensor 202 input to the non-inverting input terminal of the comparator 212 via AC-DC converter 208 is smaller than the HARD/SOFT criterion represented by the reference voltage $A_0$, the output of the comparator 212 remains low. Therefore, the control signal produced by the controller 100 is LOW, holding the shock absorber in SOFT mode.

As the vehicle starts to travel over a road full of dips and bumps as illustrated in the zone "UNDULANT" in FIG. 6(A), vibration of the vehicle body as a whole causing rolling and pitching increases while the relatively high-frequency vibrations of the road wheels remains relatively weak. Therefore, the amplitude of the high-frequency component of the output of the road sensor 202 remains low. On the other hand, as vehicle body vibrations increase, the low-frequency component of the road sensor output increases. Therefore, the waveform of the output of the low-pass filter 204 becomes more pronounced as illustrated in FIG. 6(B). As a result, the output level of the AC-DC converter 208 jumps to a high level as shown in FIG. 6(D). On the other hand, the output level of the AC-DC converter 210 remains low as shown in FIG. 6(E).

The amplitude of the low-frequency component of the road sensor varies according to the nature of the waviness of the road surface. For instance, when the peak-to-peak spacing of road features is much greater than their peak-to-trough vertical displacement, the vehicle body vibrations may be relatively weak. In this case, as the actual change in the sensor-to-road distance is relatively small, the amplitude of the low-frequency component of the road sensor 202 will remain relatively low. On the other hand, if the spacing of the road features is relatively short in relation to the peak-to-trough height, the vehicle body vibrations may become significant. In this case, the rate of change of the sensor-to-road distance per unit time become greater, resulting in a relatively high-amplitude low-frequency component of the road sensor signal.

Assuming that the road contours in the "UNDULANT" zone are sufficiently abrupt to cause vehicle rolling and pitching to an extent in excess of the HARD/SOFT criterion represented by the reference signal from the reference signal generator 216, the output of the comparator 212 will go HIGH. The controller 100 is responsive to the HIGH-level comparator output to produce a HIGH-level control signal and so operate the shock absorber in HARD mode.

At this time, since the logical value of the control signal is "1" (HIGH), the input level to the reference signal generator 218 via the inverter 224 becomes logical value "0". The diode $D_3$ thus becomes conductive to allow some of the current available at the junction via the voltage divider of resistors $R_5$ and $R_6$ to drain through the resistor $R_7$. As a result, the output level of the reference signal generator 218 is lowered by a value BC, as shown in FIG. 8. At the same time, the diode $D_1$ in the reference signal generator 216 is also turned on by the LOW level input from the inverter 224. As a result, part of the current at the junction 22 is allowed to flow through the resistor $R_3$ and the diode $D_1$. Since the high-frequency component of the road sensor 202 is still at a low amplitude and thus the output level of the comparator 214 remains LOW, the potential applied to the junction 222 via the diode $D_2$ and the resistor $R_4$ remains nil. As a result, the output level of the reference signal generator 214 as a reference signal A is lowered by a value $a_1C$, as shown in solid lines in FIG. 7.

When employing the HARD mode of operation of the shock absorber, relative displacement between the vehicle body and the road wheel is inhibited to a greater degree than in the SOFT mode of operation of the shock absorber. This causes a reduction of the amplitude of the road sensor signal $S_r$ in comparison with that obtaining in SOFT mode. This down-shift of the sensor level can be compensated for by lowering the reference signal level by a value corresponding to the reduction in the amplitude of the sensor signal level due to HARD mode operation.

In a zone labelled "ROUGH" small-scale irregularities in of the road surface increase in addition to the waviness of the road surface. As a result, the road wheels vibrate at relatively high frequencies and the vehicle body rolls and pitches due to the waviness of the road bed.

Both the high- and low-frequency components of the road sensor 202 are increased due to the overall roughness of the road surface. Since the low-frequency component of the road sensor output remains relatively strong, the output level of the compartor 212 and of the controller 100 remain HIGH, ordering continued HARD-mode operation of the shock absorber.

As set forth above, a HIGH-level control signal results in current drain via the diodes $D_1$ and $D_3$ of respective reference signal generators 216 and 218. In addition, the increase in the amplitude of the high-frequency component of the road sensor 202 means that the input level at the non-inverting input terminal of the comparator 218 increases, as shown in FIG. 6(E). When the input level at the non-inverting input terminal becomes greater than the reference signal level $B(=B_0-\beta C)$ of the reference signal generator 218, the output level of the comparator 214 goes HIGH. The HIGH-level comparator output is applied to the junction 222 of the reference signal generator 216 via the diode $D_2$ and the resistor $R_4$. Therefore, the reference signal level of the reference signal generator 216 increases by an amount $a_2D$, to the level shown in broken line in FIG. 7. This increase in the reference signal level of the reference signal generator 216 applied to the comparator 212 prevents the road wheel vibrations from influencing recognition of the road surface waviness.

In order to adjust road roughness sensing ability in the road roughness dependent suspension control set forth above, the up-switch 302 or down-switch 304 are operated. By manually operating the up-switch 302 and down-switch 304, the multiplexer 312 connects the up-coefficient generator 308 or the down-coefficient generator 310, selectively to the hold circuit 314. Namely, when the up-switch 302 is depressed, the multiplexer 312 selects the up-coefficient generator 308 to connect to the hold circuit 314. On the other hand, when the down-switch 304 is depressed, the, multiplexer selects the down-coefficient generator 310 to connect to the hold circuit 314.

When the up-coefficient generator 308 is connected to the hold circuit 314, the output of the up-coefficient generator 308 is input to and held by the hold circuit 314. In this case, the output of the up-coefficient generator 308 is a resultant of multipying the reference signal generated by the reference signal generator 216 with the up-coefficient which is smaller than one. Therefore, output of the up-coefficient generator 308 becomes smaller than the reference signal produced by the reference signal generator 216. The output of the up-coefficient generator 308 is held by the hold circuit 314 in response to the detector signal from the detector 306, which detector signal is produced whenever the vehicle travelling time or distance reaches a given value, Therefore, the held level of the hold circuit 314 is lowered. Since the output LLa of the hold circuit 314 is fed back to the reference signal generator 216 for determining the reference signal level produced by the reference signal generator 216, the level of the reference signal is lowered by the feedback from the hold circuit. Thus, the reference signal of the reference signal generator 216 is lowered everytime the up-coefficient is lowered.

Since the output of the hold circuit 312 is also connected to the inverting input terminal of the comparator 212, the lowered reference level is input to the inverting input terminal of the comparator 212. This therefore causes lowering of the reference level to be compared with the low-frequency component of the road sensor signal. This increases the sensing ability of the road roughness in the control system. Therefore, the suspension system can be operated to the HARD mode in response to a lower amplitude of the low-frequency component of the road sensor signal.

Everytime the up-switch 302 is depressed, the reference signal produced by the reference signal generator 216 is multiplied with the up-coefficient $K_u$ in the up-coefficient generator 308. Therefore, depending on the occurence of depression of the up-switch 302, the output of the hold circuit 314 as the reference level for the comparator 212 is lowered at a rate of the up-coefficient $K_u$ of the up-coefficient generator 308.

On the other hand, when the down-coefficient generator 310 is connected to the hold circuit 314, the output of the down-coefficient generator 310 is input to and held by the hold circuit 314. In this case, the output of the down-coefficient generator 310 is a resultant of multiplying the reference signal generated by the reference signal generator 216 with the down-coefficient $K_d$ which is greater than one. Therefore, output of the down-coefficient generator 310 becomes smaller than the reference signal produced by the reference signal generator 216. The output of the down-coefficient generator 310 is held by the hold circuit 314 in response to the detector signal from the detector 306, which detector signal is produced whenever the vehicle travelling time or distance reaches a given value, Therefore, the held level of the hold circuit 314 is raised. Since the output LLa of the hold circuit 314 is fed back to the reference signal generator 216 for determining the reference signal level produced by the reference signal generator 216, the level of the reference signal is raised by the feedback from the hold circuit. Thus, the reference signal of the reference signal generator 216 is raised every time the down-coefficient is raised.

Since the output of the hold circuit 314 is also connected to the inverting input terminal of the comparator 212, the raised reference level is input to the inverting input terminal of the comparator 212. This therefore causes an increase of the reference level to be compared with the low-frequency component of the road sensor signal. This lowers the sensing ability of the road roughness in the control system. Therefore, the suspension system can be operated to the HARD mode in response to a higher amplitude of the low-frequency component of the road sensor signal.

Every time the down-switch 304 is depressed, the reference signal produced by the reference signal generator 216 is multiplied with the down-coefficient $K_d$ in the down-coefficient generator 310. Therefore, depending on occurences of depression of the down-switch 304, the output of the hold circuit 314 as the reference level for the comparator 212 is lowered at a rate of the down-coefficient $K_d$ of the down-coefficient generator 310.

Therefore, as will be appreciated herefrom, by manually depressing the up-switch 302 and the down-switch 304, the road roughness sensing ability of the shown embodiment of the suspension control system can be adjusted. This allows the driver to select the suspension control characteristics depending his own tast.

Figure 9:
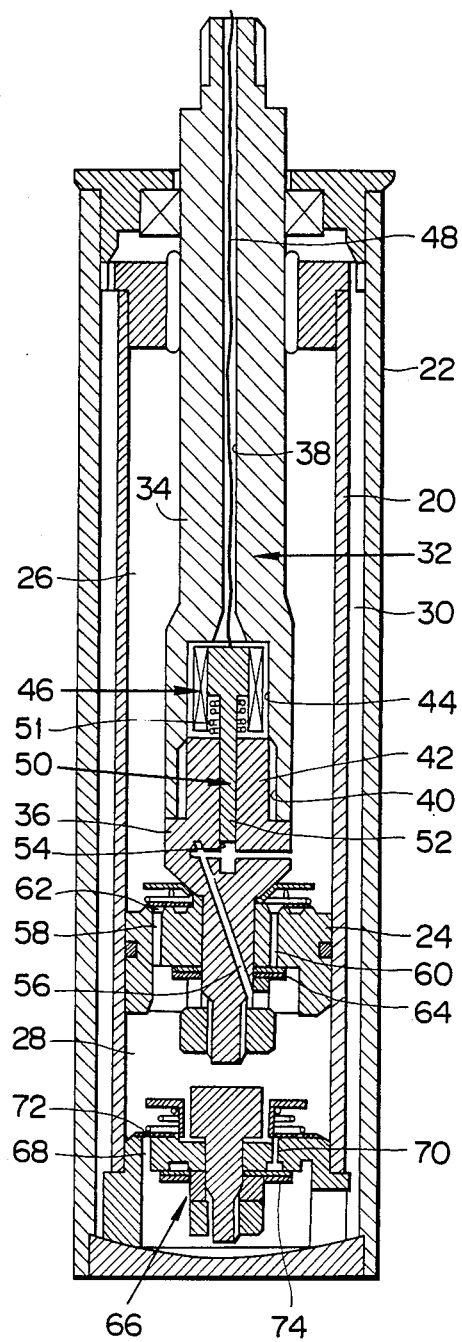
FIG. 9 is a longitudinal section through a shock absorber which is has variable damping characteristics and is used in the first embodiment of the suspension control system of FIG. 4.
Figure 10:
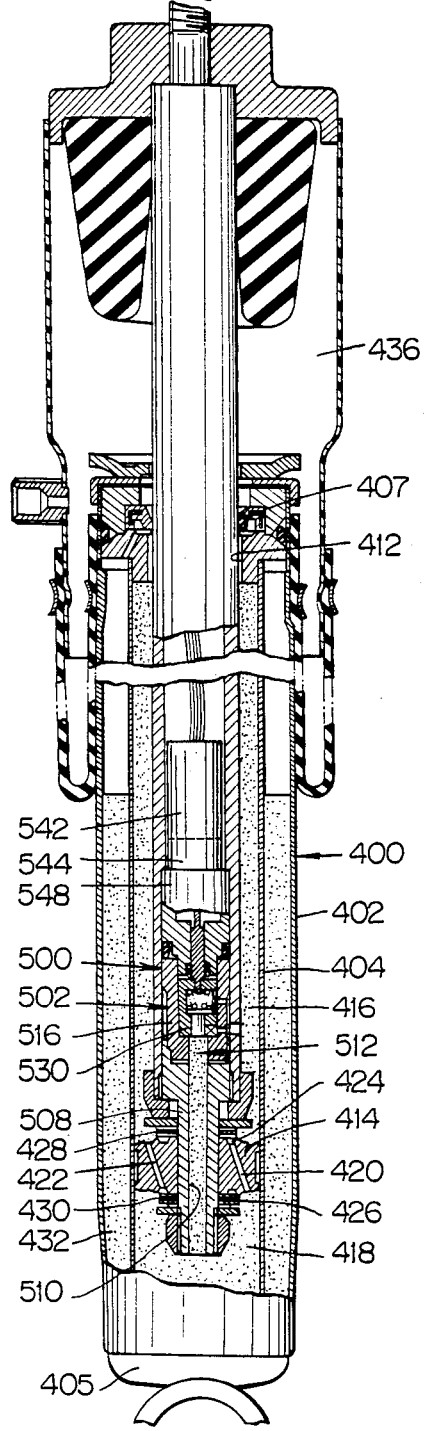
FIG. 10 is a longitudinal section of a modified embodiment of a shock absorber to be employed in the first embodiment of the suspension control system of FIG. 4.

FIG. 9 shows the detailed structure of a variable-damping-force shock absorber 12 employed in the first embodiment of the suspension control system according to the present invnetion. The shock absorber 12 generally comprises inner and outer hollow cylinders 20 and 22 arranged coaxially, and a piston 24 fitting flush within the hollow interior of the inner cylinder 20. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston road which is generally referred to by the reference number 32. The piston rod 32 comprises upper and lower segments 34 and 36. The upper segment 34 is formed with an axially extending through opening 38. The lower end of the through opening 38 opens into a recess 40 defined on the lower end of the upper segment 34. On the other hand, the lower segment 36 has an upper section 2 engageable to the recess 40 to define therein a hollow space 44. An actuator is disposed within the space 44. The actuator 46 is connected to the driver circuit 16 through a lead 48 extending through the through opening 38. The actuator 46 is associated with a movable valve body 50 which has a lower end extension 52 inserted into a guide opening 54 defined in the lower segment 36. The guide opening 54 extends across a fluid passage 56 defined through the lower segment 36 for fluid communication between the upper and lower fluid chambers 26 and 28.

The fluid passage 56 serves as a bypass for flow-restrictive fluid passages 58 and 60 formed in the piston 24. The upper end of the fluid passage 58 is closed by a resilient flow-restricting valve 62. Similarly, the lower end of the fluid passage 60 is closed by a flow-restricting valve 64. The flow-restricting valves 62 and 64 serve as check valves for establishing one-way fluid communication in opposite directions. In addition, since the flow-restriction valves 62 and 64 are biased toward the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The cross-sectional area of the fluid passages 58 and 60 and the set pressures of the fluid-restriction valves 60 and 62 determine the damping force produced in HIGH damping force mode. The cross-sectional area of the fluid passage 56 determines the drop in the damping force in the LOW damping force mode in comparison with that in the HIGH damping force mode.

The movable valve body 50 is normally biased upwards by means of a coil spring 51. As a result, when the actuator 46 is not energized, the lower end section 52 of the valve body 50 is separated from the fluid passage 56 to allow fluid communication between the upper and lower chamber. When the actuator 46 is energized, the valve body 50 moves downwards against the resilient force of the coil spring 51 to block the fluid passage 56 with the lower end extension 2. As a result, fluid communication between the upper and lower fluid chambers 26 and 28 via the fluid passage 56 is blocked. When fluid communication through the fluid passage is permitted, the damping force produced by the shock absorber 14 remains LOW. On the other hand, when the fluid passage 56 is shut, fluid flow rate is reduced, thus increasing the damping force produced. Therefore, when the valve body 50 is shifted to the lowered position, he shock absorber works in HIGH damping force mode to produce a higher damping force against vertical shocks.

A bottom valve 66 is installed between the lower fluid chamber 28 and the fluid reservoir chamber 30. The bottom valve 66 is secured to the lower end of the inner cylinder and includes fluid passages 68 and 70. The upper end of the fluid passage 68 is closed by a flow-restriction valve 72. The lower end of the fluid passage 70 is closed by a flow-restriction valve 74.

In the normal state wherein the control signal of the controller 100 remains LOW, the movable valve body 50 is held in its upper position by the effect of the spring force 51 so that the lower end extension 2 does not project into the fluid passage 56. Therefore, the fluid communication is established through both the fluid passage 56 and the applicable one of the flow-restricting fluid passages 58 and 60. As a result, the total flow rectriction is relatively weak to allow the shock absrober to operate in SOFT mode.

In response to a HIGH-level control signal from the controller 100, the driver signal generator 102 corresponding to each shock absorber 12 becomes active to energize the actuator 46. The actuator 46 drives the movable valve body 50 downward. This downward movement shifts the lower end of the extension 2 of the valve body 50 into the fluid passage 56 so as to block fluid communication between the upper and lower fluid chambers 26 and 28 via the fluid passage 56. Therefore, the fluid can flow between the upper and lower chambers 26 and 28 only through one of the fluid passages 58 and 60. The fluid flow restriction is, thus, increased, resulting in a greater damping force than is produced in the SOFT mode. In other words, the shock absorber 12 operates in HARD mode.

FIGS. 10 to 13 show a modified form of the variable-damping-characteristic shock absorber of FIG. 9. In this modification, the shock absorber 12 can be operated in any of three modes, namely HARD mode, SOFT mode and MEDIUM mode, in the last of which damping characteristics intermediate to those of HARD mode and SOFT mode are achieved.

The hydraulic shock absorber 12 has coaxial inner and outer cylinders 402 and 404. Top and bottom ends of the cylinders 402 and 404 are plugged with fittings 406 and 405. The fitting 406 includes a seal 407 which establishes a liquid-tight seal. A piston rod 408 extends through an opening 412 formed in the fitting 406 and is rigidly connected to a vehicle body (not shown) at its top end. The piston rod 408 is, in turn, connected to a piston 14 reciprocally housed within the inner cylinder 402 and defining upper and lower fluid chambers 416 and 418 therein.

The piston 414 has fluid passages 420 and 422 connecting the upper and lower fluid chambers 416 and 418. The piston 214 also has annular grooves 424 and 426 along its upper and lower surfaces concentric about its axis. The upper end of the fluid passage 420 opens into the groove 424. On the other hand, the lower end of the fluid passage 422 opens into the groove 426. Upper and lower check valves 428 and 430 are provided opposite the grooves 424 and 426 respectively to close the grooves when in their closed positions. The lower end of the fluid passage 420 opens onto the lower surface of the piston at a point outside of the check valve 430. Likewise the upper end of the fluid passage 422 opens onto the upper surface of the piston at a point outside of the check valve 428.

Therefore, the fluid passage 422 is active during the piston expansion stroke, i.e. during rebound of the shock absorber. At this time, the check valve 428 prevents fluid flow through the fluid passage 420. On the other hand, during the piston compression stroke, i.e. during bounding movement of the suspension, the fluid passage 420 is active, allowing fluid flow from the lower fluid chamber 418 to the upper fluid chamber 416 and the fluid passage 422 is blocked by the check valve 430.

The piston rod 408 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 502 allows three steps of variation of the damping force, i.e., HARD mode, MEDIUM mode and SOFT mode, the narowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

Figure 11:
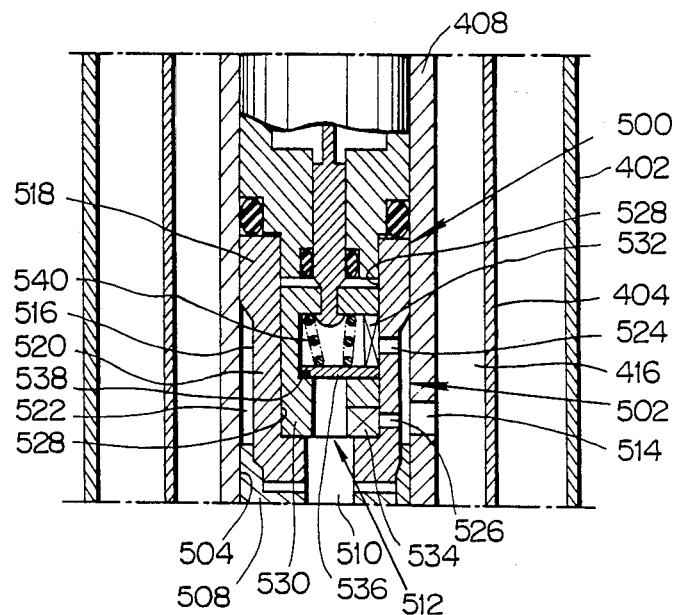
FIG. 11 is a partial longitudinal section through the damping force adjusting mechanism of the shock absorber of FIG. 10.

As shown in FIG. 11, the piston rod 408 defines an axially extending through opening 504 with the lower end opening into the lower fluid chamber 418. A fitting 508 seals the lower end of the opening 504 of the piston rod and has axially extending through opening 510, the axis of which is parallel to the axis of the through opening 504 of the piston rod. Thus, the through openings 504 and 510 constitute a fluid path 512 extending through the piston rod. The piston rod 408 also has one or more radially extending orifices or openings 514 opening into the upper fluid chamber 416. Thus, the upper and lower fluid chambers 416 and 418 are in communication through the fluid path 512 and the radial orifices 514.

A stationary valve member 516 with a flaring upper end 518 is inserted into the through opening 504 of the piston rod. The outer periphery of the flaring end 518 of the stationary valve member 516 is in sealing contact with the internal periphery of the through opening. The stationary valve member 516 has a portion 520 with a smaller diameter than that of the upper end 518 and so as to define an annular chamber 522 in conjunction with the inner periphery of the through opening 504 of the piston rod. The stationary valve member 516 has two sets of radially extending orifices 524 and 526 and an internal space 528. The radially extending orifices 524 and 526 establish communication between the internal space 528 and the annular chamber 522. A movable or rotary valve member 530 is disposed within the internal space 528 of the stationary valve member 516. The outer periphery of the rotary valve member 530 slidingly and sealingly contacts the inner surface of the stationary valve member 516 to establish a liquid-tight seal therebetween. Radially extending orifices 532 and 534 are defined in the rotary valve member 530 at positions opposite the orifices 524 and 526 of the stationary valve member 516.

Figure 12A:
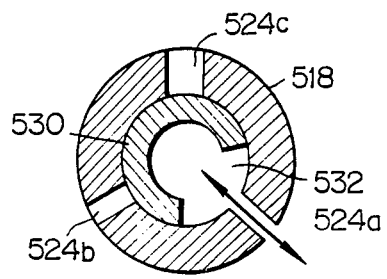
FIG. 12(A) and 12(B) are cross-sections trough the mechanism shown in FIG. 11 at positions revealing the three possible fluid flow paths.
Figure 12B:
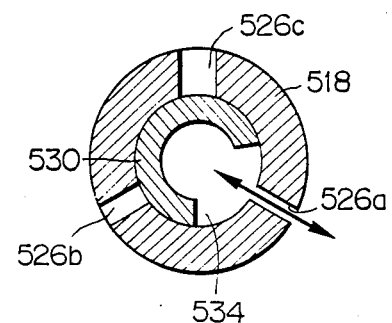

As shown in FIGS. 12(A) and 12(B), the orifices 524 and 526 respectively include first, second and third orifices 524a, 524b, 524c, and 526a, 526b, and 526c. The first orifices 524a and 526a have the narrowest cross-sections and the orifices 532 and 534 are adapted to be in alignment with the first orifices to establish fluid communication between the upper and lower fluid chambers 416 and 418 in the case of the HARD mode. The third orifices 524c and 526c have the widest cross-sections and the orifices 532 and 534 are adapted to be in alignment with the third orifices in the case of the SOFT mode. The cross-sections of the second orifices 524b and 526c are intermediate those of the first and third orifices and the orifices 532 and 534 are adapted to align therewith in the case of the MEDIUM mode.

A check valve 536 is provided within an internal space of the rotary valve member 530. The check valve 536 is normally biased towards a valve seat 538 by means of a bias spring 540 for allowing one-way fluid flow from the lower fluid chamber to the upper fluid chamber. This cause the bound damping force to be somewhat weaker than the rebound damping force.

Figure 13:
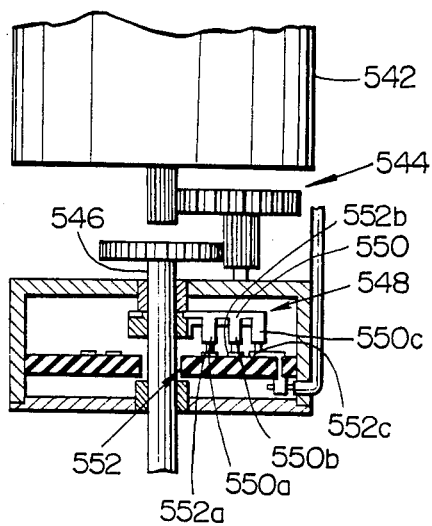
FIG. 13 is an enlarged elevation in partial section of actuating elements of the mechanism shown in FIG. 11.

The rotary valve member 530 is associated with an electrically operable actuator such as an electrical step motor 542 through a differential gear unit 544 and an output shaft 546 as shown in FIG. 13. A potentiometer 548 is associated with the output shaft 546. The potentiometer 548 includes a movable contact 550 with contactors 550a, 550b and 550c. The contactors 550a, 550b and 550c are adapted to slidingly contact stationary contact elements 552a, 552b and 552c of a stationary contact 552. According to the electrical connections between the movable contact and the stationary contact, the potentiometer 548 produces a mode signal representative of the rotary valve position and thus indicative of the selected mode of the damping force adjusting mechanism. The step motor 542 is electrically connected to a controller 100 to receive the control signal as a mode selector signal which drive the motor 542 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 10, the shock absorber has a fluid reservoir chamber 432 between its inner and outer cylinders 402 and 404, which fluid reservoir chamber 432 is in communication with the lower fluid chamber 418 via the bottom fitting 405 described previously. The bottom fitting 405 may serve to produce damping force in cooperation with the piston and the damping force adjusting mechanism during bounding and rebounding motion of the vehicle. A relatively low pressure pneumatic chamber 436 is also defined between the inner and outer cylinders 402 and 404.

The operation of the damping force adjusting mechanism 500 will be briefly described herebelow with reference to FIG. 12. FIGS. 12(A) and 12(B) show the case of the HARD mode. In this case, the orifice 532 of the rotary valve 530 is in alignment with the orifice 524a and the orifice 534 is in alignment with the orificev 526a. During vehicle rebouning motion, i.e., in the piston compression stroke, the fluid flows from the upper fluid chamber 416 to the lower fluid chamber 418 through the orifice 526a. On the other hand, during vehicle bounding motion, the fluid flows from the lower fluid chamber 418 to the upper fluid chamber 416 through orifices 524a and 526a. Since the first orifices 524a and 526a are the narrowest, the damping force produced in this mode is the highest among the three selectable modes.

In case of the MEDIUM mode, the orifices 532 and 534 of the rotary valve member 530 are respectively in alignment with the second orifices 524b and 526b.

In case of the SOFT mode, the orifices 532 and 534 align with the third orifices 524c and 526c, respectively to cause fluid flow. Since the third orifices 524c and 526c are the widest of the three sets, as described above, the damping force created in this SOFT mode is the lowest.

According to the shown embodiment, the electric step motor 542 is connected to the controller 100 through the driver circuit 16. Similarly to the case of the two-way shock absorber, the controller 100 selects any appropriate damping force state in accordance with detected road surface conditions but in this case produces a three-way control signal for actuating the shock absorber to one of the SOFT, MEDIUM and HARD modes. The driver circuit 16 is responsive to the control signal to drive the step motor 542 to operate the rotary valve member 530 to the corresponding valve position.

As an alternative in the modification set forth above, only SOFT and MEDIUM modes may be used for road-condition-dependent suspension control. Therefore, when the HARD mode is selected in the foregoing first embodiment set forth above the controller 100 actuates the shock absorber to MEDIUM mode.

Figure 14:
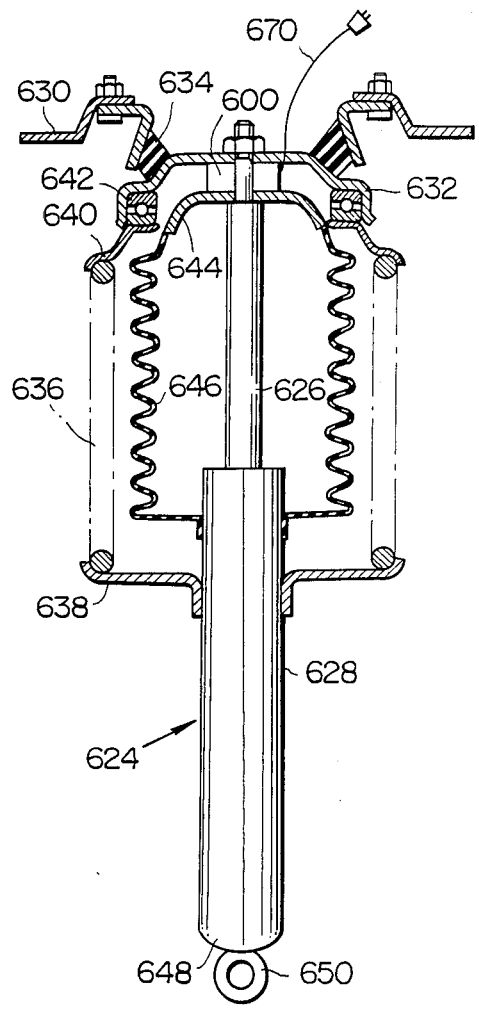
FIG. 14 is a front elevation of a strut assembly to be employed in the aforementioned first embodiment of the suspension control system as a replacement of the foregoing shock absorber assembly of FIG. 9, in which a different type of a road sensor is employed.
Figure 15:
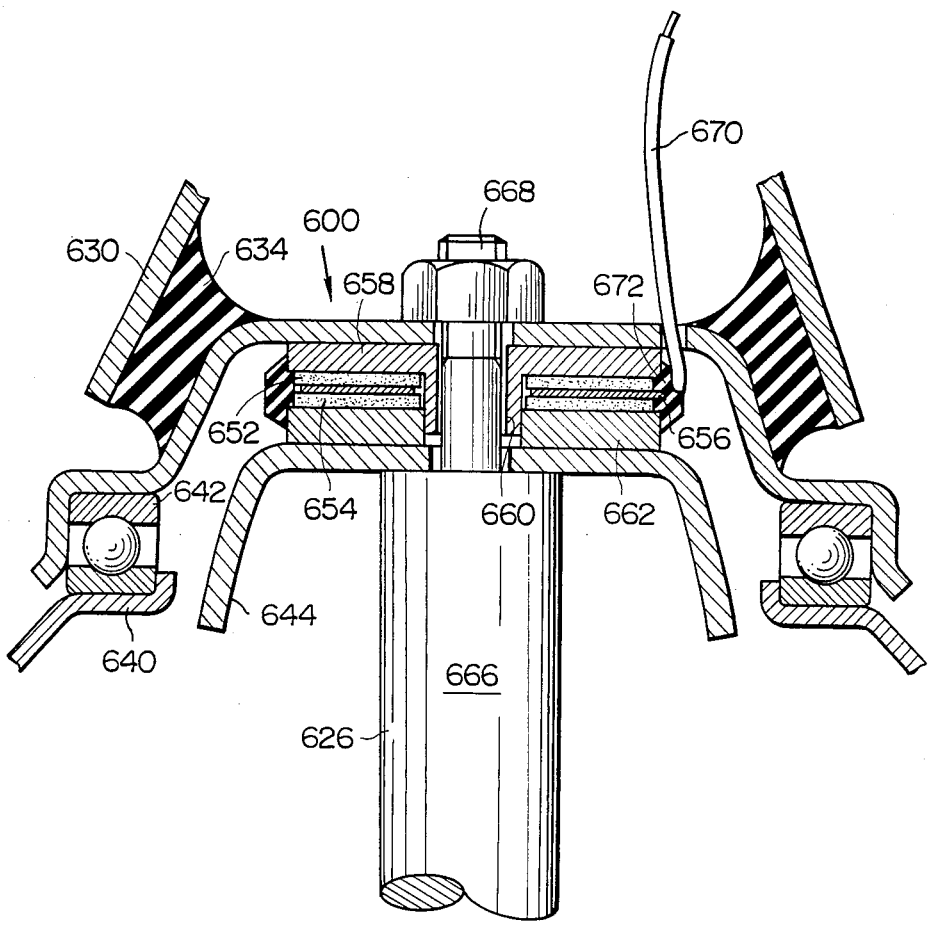
FIG. 15 is an elnaged section of the major part of the suspension strut of FIG. 14.

FIGS. 14 and 15 show a modification of the first embodiment of the suspension control system according to the present invention. This modification also employs the variable damping force shock absorber identical to that disclosed with respect to the first embodiment of the invention. On the other hand, this embodiment employs a vibration sensor for detecting the relative displacement between the vehicle body and the road wheel axle, instead of the road sensor employed in the first embodiment.

The vibration sensor 600 is associated with a shock absorber in order to monitor axial displacement of the piston rod thereof. The vibration sensor 600 produces an AC vibration sensor signal with a value representative of the relative displacement between the vehicle body and the road wheel axle. The vibration sensor signal is fed to a high-frequency filter circuit 602 and a low-frequency filter circuit 604. The high-frequency filter circuit 602 is adapted to remove the high-frequency components from the vibration sensor signal and pass only the low-frequency components thereof. The high-frequency filter circuit 602 outputs a direct-current signal representative of the magnitude of vibration of the vehicle body, which signal will be referred to hereafter as "low-frequency component indicative signal". The low-frequency filter circuit 604 is adapted to remove the low-frequency components from the vibration sensor signal and pass only the high-frequency components thereof. The low-frequency filter circuit 604 produces a direct-current signal representative of the magnitude of high-frequency vibrations of the road wheel axle, which signal will be referred to hereafter as "high-frequency component indicative signal".

The low-frequency component indicative signal from the high-frequency filter circuit 602 is input to a comparator 606 through its non-inverting input terminal. Similarly, the high-frequency component indicative signal of the high-frequency components filter circuit 604 is input to a comparator 608 through its non-inverting input terminal. Each of the comparators 606 and 608 has inverting input terminals connected to a corresponding reference signal generator 610 or 612. On the other hand, the comparator 606 has the output terminal connected to a controller 14 which is substantially the same as set forth with respect to FIG. 4 and produces a control signal to operate the shock absorber between HARD and SOFT modes. The output terminal of the comparator 608 is connected to the reference signal generator 610.

The reference signal generator 610 has a voltage divider 616 including resistors $R_{10}$ and $R_{11}$ which generates a predetermined voltage at the junction 618 between the resistors. Through the junction 618, the reference signal generator 610 is connected to the inverting input terminal of the comparator 606. The junction 618 is also connected to the controller 614 via a diode $D_{10}$ and a resistor $R_{12}$ to receive therefrom the control signal. Also, the junction 618 is connected to the output terminal of the comparator 606 via a diode $D_{11}$ and a resistor $R_{13}$. On the other hand, the reference signal generator 612 has a voltage divider 620 including resistors $R_{14}$ and $R_{15}$ with a junction 22 therebetween. The junction 22 is connected to the controller 614 through a diode $D_{12}$ and a resistor $R_{16}$.

In comparison with the circuitry of the first embodiment of suspension control system, the inverter is omitted and the polarity of the diodes between the junctions and the controller is reversed. This is due to the fact that, since the sensitivity of the vibration sensor is boosted by the greater damping force produced in the HARD mode of shock absorber operation, compensating by increasing the reference value is necessary achieved for uniform detection of the HARD suspension criterion.

FIG. 14 shows a suspension strut assembly emploiyed in the modification of suspension control system according to the present invention, of FIG. 4. The strut assembly includes a shock absorber 624 having variable damping characteristics and operable in either HARD or SOFT mode. A piston rod 626 extends from the shock absorber cylinder 628 and is connected to a strut housing 630 of the vehicle body through a mounting bracket 632. A rubber insulator 634 is interpositioned between the mounting bracket 632 and the strut housing 630 for absorbing vibrations transmitted between the vehicle body and the shock absorber.

A suspension coil spring 636 is wound around the piston rod 626 of the shock absorber. The lower end of the suspension coil spring 636 seats on a lower spring seat 638 fixed to the outer periphery of the outer shock absorber cylinder. On the other hand, the upper end of the suspension coil spring 636 seats on an upper spring seat 640 which is connected to the mounting bracket 632 via a bearing assembly 642. The bearing assembly 642 allows the strut assembly to pivot freely about the piston rod 626. The upper spring seat 640 is rigidly secured to a dust insulator cover 644, to which the upper end of elastically deformable rubber dust insulator 646 is secured. The lower end of the dust insulator 646 is secured to the outer periphery of the outer cylinder of the shock absorber.

A closure 648 with a connecting ring 650 is fitted to the bottom of the shock absorber cylinder. The shock absorber cylinder is connected to a suspension arm (not shown) via the connecting ring.

The vibration sensor 600 is inserted between the mounting bracket 632 and the strut housing 630. As shown in FIG. 15, the vibration sensor 600 has a pair of piezoelectric elements 652 and 654 sandwiching a terminal plate 656. The piezoelectric element 652 is fixed to a disc plate 658 with an axially extending cylindrical section 660. The disc plate 658 is fixed to the mounting bracked 632 for motion therewith. On the other hand, the piezoelectric element 654 is secured to a disc plate 662 which is, conversely, fixed to the cover plate 644 which is fixedly mounted on a step 664 formed between the shaft 666 and the threaded end 668 of the piston rod.

The cylindrical section 660 surrounds the threaded section 668 of the piston rod.

A lead wire 670 extends from the terminal plate 656 through a rubber seal 672. The lead wire 670 is connected to the high-frequency filter circuit 602 and the low-frequency filter circuit 604. The output of the vibration sensor 600, i.e., the vibration sensor signal, is thus fed to the filter circuits 602 and 604 via the terminal plate 656 and the lead wire 670.

The vibration sensor 600 constructed as above is not responsive to the static load applied to the vehicle, which generally causes a lowering of the vehicle level, such as passengers and/or luggage. The vibration sensor 600 is thus responsive only to dynamic loads due to vertical displacements and forces applied to the road wheel and vehicle body. The vibration sensor signal is thus indicative solely of the dynamic load applied to the vibration sensor 600.

Figure 16:
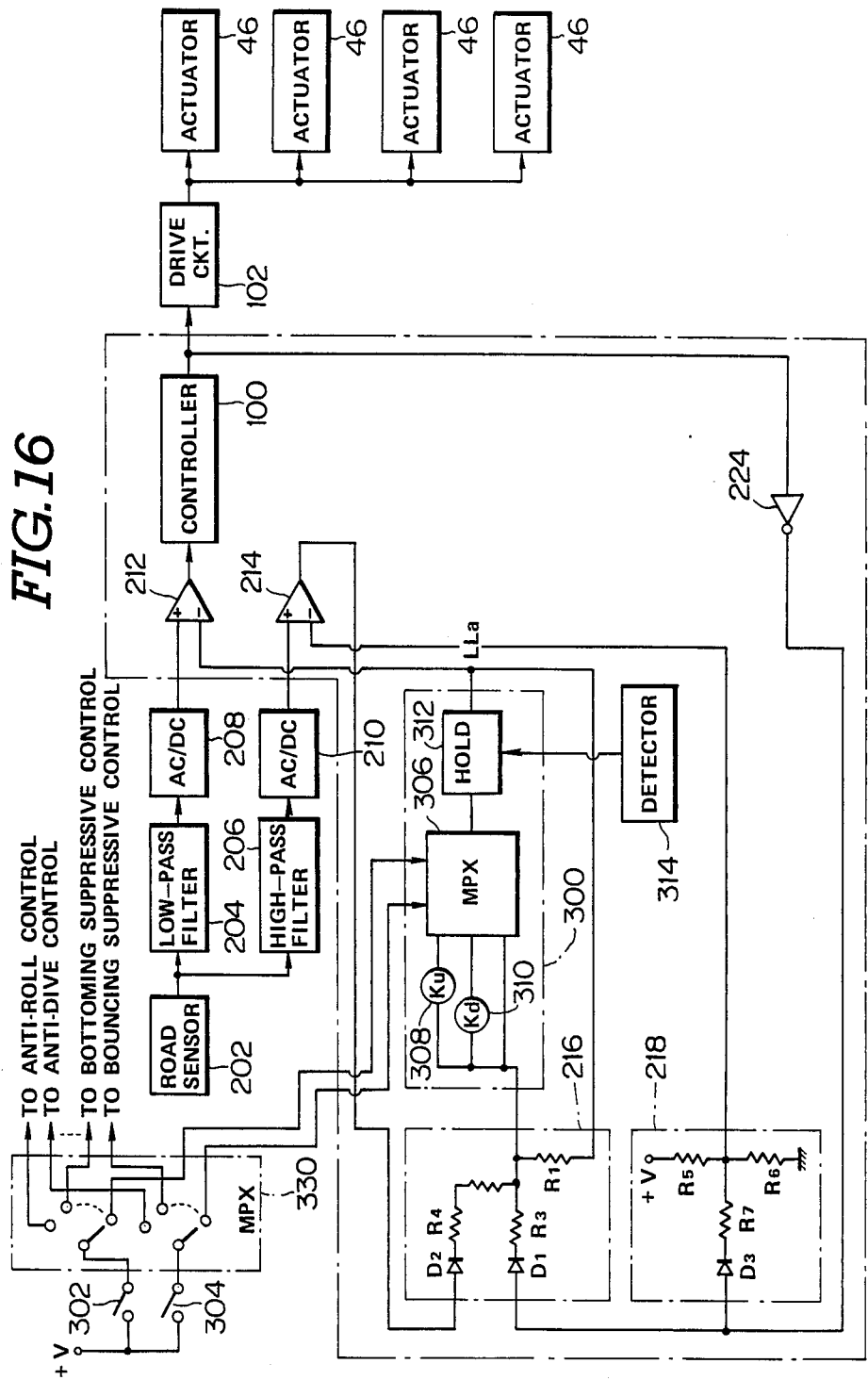
FIG. 16 is a circuit diagram showing a modification of the first embodiment of the suspension control system of FIG. 4.

FIG. 16 shows a modification of the preferred embodiment of the suspension control system of FIG. 4. In the showm modification, a multiplexer 330 is interposed between the up- and down-switch 304 and the multiplexer 312. The multiplexer 330 is designed for selecting one of a plurality of suspension control parameters for performing suspension control. For example, the multiplexer 330 selects one of paramters for performing one of roll-suppressive suspension control, braking-responsive suspension control (anti-dive control), acceleration responsive suspension control (anti-squat control), deceleration responsive suspension control (anti-dive control), bottoming-suppressive suspension control and so forth, in addition to the road roughness dependent suspension control as set forth with respect to the first embodiment.

Therefore, the multiplexer 330 is connected to roll-suppressive suspension control circuit, braking-responsive suspension control (anti-dive control) circuit, acceleration responsive suspension control (anti-squat control) circuit, deceleration responsive suspension control (anti-dive control) circuit, bottoming-suppressive suspension control circuit and so forth. The multiplexer 330 selectively selects the up-switch 302 and the down-switch 304 to selected on of the aforementioned control circuits for adjusting suspension control characteristics with respect to the selected control item. In this modification, the multiplexer is designed to automatically select one of the suspension control items depending upon vehicle behaviour during travelling and/or vehicle condition variable depending upon overall driving distance such as odometer value, driving manner and so forth. In the shown modification, as a vehicle condition indicative value, occurence of the aforementioned suspension controls for hardening the suspension characteristics is used. Such vehicle travelling condition dependent and vehicle condition dependent adjustment of the suspension control characteristcs has been disclosed in the co-pending U.S. patent application Ser. No. 873,995 filed by Fukashi SUGASAWA et al. on June 13, 1986, now U.S. Pat. No. 4,673,194, issued June 16, 1987. The disclosure of this co-pending U.S. patent application is herein incoporated by reference for the sake of disclosure.

Therefore, when the up-switch 302 or the down-switch 304 is manually operated, adjustment of suspension control characteristics can taken place with respect to the control item selected by the multiplexer 330.

Figure 17:
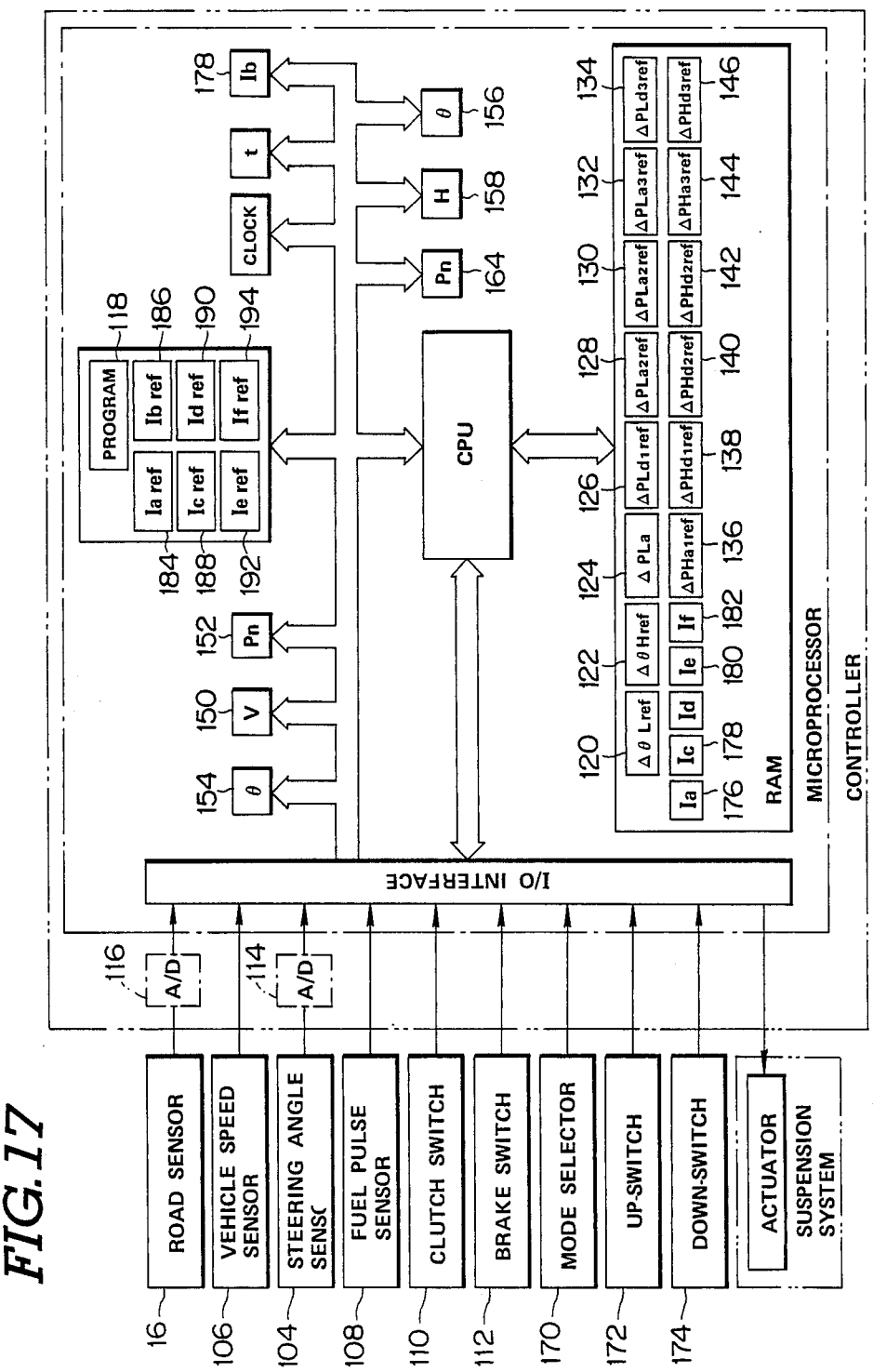
FIG. 17 is a block diagram of the second embodiment of the suspension control system according to the present invention.

FIG. 17 illustrates the second embodiment of the suspension control system according to the present invention. Similarly to the foregoing first embodiment of the suspension control system, the shown embodiment of the suspension control system includes an actuator 46 for adjusting suspension characteristics at least between HARD mode and SOFT mode. In this embodiment, roll-suppressive suspension control, anti-squat suspension control, anti-dive suspension control, bouncing responsive suspension control, bottoming suppressive suspension control, vehicle stopping responsive suspension control are perfromed. The roll-suppressive suspension control is taken place generally with reference to the steering angular displacement. Anti-squats suspension control is taken place generally with reference to the vehicular acceleration. Anti-dive suspension control is performed with taking the vehicular deceleration as a dive-indicative parameter. Bounding responsive and bottoming responsive suspension controls are performed with taking relative displacement between the vehicle body and the road wheel. Vehicle stopping responsive and anti-dive control may be performed in response to braking condition of the vehicle. In the vehicle stopping responsive suspension control is perfromed in order to harden suspension characteristics in order to suppress discomfortable vehicle pitching motion at stopping and starting. In order to perform the above-listed and other suspension control, the driver circuit 102 is connected, in turn, to the controller 100 which comprises a microprocessor and produces control signals derived from detected vehicle driving conditions.

In order to monitor vehicle driving conditions, the controller 100 is connected for input from a steering angle sensor 104, a vehicle speed sensor 106, a fuel pulse sensor 108, a clutch switch 110 and a brake switch 112. Also, the controller 100 is connected to the road sensor 16. As is well known, the steering angle sensor 104 is mounted on a steering column 103 to monitor angular displacement of a steering wheel 105 and produces a steering angle indicative signal indicative thereof. The steering angle indicative signal is utilized as a parameter representative of rolling force and/or yawing force exerted on the vehicle. The fuel pulse sensor 108 monitors fuel injection pulse width and thus monitors acceleration and deceleration of the vehicle, both of which cause vehicular profile changes, i.e. winding-up or nose-dive. The fuel pulse sensor 108 produces a fuel pulse width indicative signal representative of the fuel pulse width supplied to a fuel supply system (not shown) in the automotive engine. The brake switch 112 detects application of automotive brakes (not shown) and produces a braking condition indicative signal. Similarly, the clutch switch 110 detects engagement and release of an automotive clutch associated with a power transmission and produces a clutch position indicative signal.

The road sensor 16 is arranged to monitor the vehicle height relative to the road surface. The road sensor 16 produces a road condition indicative signal representative of the roughness of the road surface.

The controller 100 derives control signals based on the various aforementioned sensor signals.

Suspension control in response to the steering angle indicative signal from the steering angle sensor has been disclosed in the co-pending U.S. patent application Ser. No. 678,806, filed on Dec. 6, 1984, and the corresponding European Patent Application which has been published under Publication No. 01 45 013. Suspension control for suppressing winding-up and nose-dive has been disclosed in the co-pending U.S. patent application Ser. No. 649,484, filed Sept. 11, 1984, the corresponding European Patent Application of which has been published under Publication No. 01 35 902, the co-pending U.S. patent application Ser. No. 791,061, filed on Oct. 24, 1985, and the co-pending Japanese Patent Application No. 59-11734 which has been published under the Publication No.60-154906. Road condition-dependent and vehicular sway-dependent suspension control have been disclosed in the co-pending U.S. patent application Ser. No. 647,648, filed on Sept. 6, 1986, the co-pending U.S. patent application Ser. No. 706,279, filed on Feb. 27, 1985, the corresponding European Patent Application of which has been published under Publication No. 01 57 181, the co-pending U.S. patent application Ser. No. 744,379, filed on June 13, 1985, the corresponding European Patent Application of which has been published under Publication No. 01 66 313, and the co-pending U.S. patent application Ser. No. 751,513, filed on July 3, 1985, the corresponding European Patent Application of which has been published under Publication No. 01 67 455. All of the above-listed co-pending applications have been assigned to the owner of the present invention. The contents of the listed co-pending applications are hereby incorporated by reference for the sake of disclosure.

As shown in phantom line in FIG. 3, the controller 100 may include analog-to-digital (A/D) converters 114 and 116 in cases where the road sensor 16 and/or the steering angle sensor 104 employed in the suspension control system produce analog signals. In this case, the A/D converter 114 is connected to the road sensor 16 to receive an analog road condition indicative signal for conversion to a digital signal corresponding to the analog signal. On the other hand, the A/D converter 116 is connected to a steering angle sensor 104 to receive the steering angle indicative signal for conversion to a digital signal.

In practice, the steering angle sensor 104 produces a pulse signal at every predetermined angle of angular displacement of the steering column. This kind of steering angle sensors has been disclosed in Japanese Patent First Publications (Tokkai) Showa Nos. 61-38515 and 61-61005, respectively published on Feb. 24, 1986 and Mar. 28, 1986. The contents of these prior publications are hereby incoporated by reference for the sake of disclosure. Since the steering angle sensor 104 employed in the practical embodiment produces a digital steering angle indicative signal, the A/D converter 116 is not required. On the other hand, in the practical embodiment, the road sensor 16 comprises a kind of potentiometer which produces an analog signal representative of the relative distance between the vehicle body and the wheel axle.

The vehicle speed sensor 106 is of per se well-known constuction and monitors the rate of rotation of a standard speedometer cable or of the output shaft of the power transmission or of the propeller shaft. As is well known, the vehicle speed sensor 106 produces a pulse signal serving as the vehicle speed indicative signal at each predetermined angular position of the rotating body. Therefore, the frequency of the pulse signal produced by the vehicle speed sensor is proportional to the vehicle speed.

The clutch switch 110 is held ON, i.e. closed, while the clutch is connected. On the other hand, the clutch switch 110 is turned OFF in response to release of the clutch. Similarly, the brake switch 112 turns ON in response to application of the vehicular brakes and remains OFF while the vehicular brakes are not applied. In practice, the clutch switch 110 may be a normally-closed switch disposed near a clutch pedal and is open when the clutch pedal is fully depressed. On the other hand, the brake switch 112 is a normally-open switch and is disposed near a brake pedal so as to be turned on in response to depression of the brake pedal.

The road sensor 16, the steering angle sensor 104, the vehicle speed sensor 106, the fuel pulse sensor 108, the clutch switch 110 and the brake switch 112 are connected to an input/output interface of the microprocessor which constitutes the major part of the controller 100. The microprocessor includes CPU, RAM, ROM and a clock pulse generator. ROM has a program memory block 118 storing a roll-suppressive suspension control program and a pitch-suppressive suspension control program. RAM includes a roll criterion-representative reference value $\Delta\theta L_{ref}$ memory block 120. In the shown embodiment, the roll criterion-representative reference value memory block 120 is accessed while the road surface is smooth. RAM also includes another roll criterion-representative reference value $\Delta\theta H_{ref}$ memory block 122. The roll criterion-representative reference value memory block 122 is accessed while the road surface is rough. RAM also includes memory blocks 124, 126, 128, 130, 132, 134, 136, 138, 140, 142, 144 and 146. The memory blocks 124, 128, 132 respectively store squat or winding-up criterion-representative reference values $\Delta PLa1_{ref}$, $\Delta PLa2_{ref}$ and $\Delta PLa3_{ref}$ which are selectively accessed depending upon the power transmission gear positions, i.e., first, second and third gear positions, while the vehicle is travelling on a smooth road. The memory blocks 126, 130, 134 respectively store nose-dive criterion-representation reference values $\Delta PLd1_{ref}$, $\Delta PLd2_{ref}$ and $\Delta PLd3_{ref}$ which are selectively accessed depending upon the power transmission gear positions, i.e., first, second and third gear positions, while on a smooth road. The memory blocks 136, 140, 144 respectively store squat or winding-up criterion-representative reference values $\Delta PHa1_{ref}$, $\Delta PHa2_{ref}$ and $\Delta PHa3_{ref}$ which are selectively accessed depending upon the power transmission gear positions, i.e., first, second and third gear positions, while the vehicle is travelling on a rough road. The memory blocks 138, 142, 146 respectively stores nose-dive criterion-representative reference values $\Delta PHd1_{ref}$, $\Delta PHd2_{ref}$ and $\Delta PHd3_{ref}$ which are selectively accessed depending upon the power transmission gear positions, while on a rough road. ROM also includes a memory block 148 storing a road-roughness criterion-representative reference value $\Delta H_{ref}$.

The microprocessor also includes a vehicle speed counter 150 for counting a vehicle speed indicative pulses from the vehicle speed sensor 106 for a given unit of time defined by clock pulses from the clock pulse generator. The vehicle speed counter 150 outputs a vehicle speed value V indicative of the vehicle speed. The microprocessor also has a fuel pulse counter 152 which counts clock pulses in order to measure the pulse width of the fuel pulse indicative also includes memory blocks 124, 126, 128, 130, 132, 134, 136, 138, 140, 142, 144 and 146. The memory blocks 124, 128, 132 respectively store scout or winding-up criterion-representative reference values $\Delta PLa1_{ref}$, $\Delta PLa2_{ref}$ and $\Delta PLa3_{ref}$ which are selectively accessed depending upon the power transmission gear positions, i.e., first, second and third gear positions, while the vehicle is travelling on a smooth road. The memory blocks 126, 130, 134 respectively store nose-dive criterion-representative reference values $\Delta PLd1_{ref}$, $\Delta PLd2_{ref}$ and $\Delta PLd3_{ref}$ which are selectively accessed depending upon the power transmission gear positions, i.e., first, second and third gear positions, while on a smooth road. The memory blocks 136, 140, 144 respectively store scout or winding-up criterion-representative reference values $\Delta PHa1_{ref}$, $\Delta PHa2_{ref}$ and $\Delta PHa3_{ref}$ which are selectively accessed depending upon the power transmission gear positions, i.e., first, second and third gear positions, while the vehicle is travelling on a rough road. The memory blocks 138, 142, 146 respectively stores nose-dive criterion-representative reference values $\Delta PHd1_{ref}$, $\Delta PHd2_{ref}$ and $\Delta PHd3_{ref}$ which are selectively accessed depending upon the power transmission gear positions, while on a rough road. ROM also includes a memory block 148 storing a road-roughness criterion-representative reference value $\Delta H_{ref}$.

The microprocessor also includes a vehicle speed counter 150 for counting a vehicle speed indicative pulses from the vehicle speed sensor 106 for a given unit of time defined by clock pulses from the clock pulse generator. The vehicle speed counter 150 outputs a vehicle speed value V indicative of the vehicle speed. The microprocessor also has a fuel pulse counter 152 which counts clock pulses in order to measure the pulse width of the fuel pulse indicative signal from the fuel pulse sensor 108. The fuel pulse indicative signal from the fuel pulse sensor 108 may have a pulse width correspondiing to the fuel injection pulse supplied to the fuel supply system of the automotive engine. The fuel supply pulse width varies with engine load, i.e. it depends mainly upon acceleration and deceleration of the engine, so that the fuel pulse counter value Pn represents engine load. Its derivative $\Delta$Pn thus represents acceleration and deceleration of the vehicular engine. The fuel pulse counter 152 produces a fuel pulse width indicative signal. A steering angle counter 154 is also increments or decrements its counter value in response to the steering angle indicative signal from the steering angle sensor 104. In practice, the steering angle indicative signal contains a component indicative of the steering direction, clockwise or counterclockwise. Therefore, the steering angle counter 154 increments and decrements the counter value depending upon the steering direction. In the shown embodiment, the steering angle counter 154 decrements its counter value when the steering angle indicative signal has a steering direction indicative component indicative of a turn to the left, and increments its counter value in response to a steering angle indicative signal indicative of a right-hand turn.

A register 156 is provided for temporarily storing the stering angle counter value $\theta$. The register value $\theta$ is updated everytime the roll-suppressive suspension control program is executed. A register 158 is also provided in the microprocessor for storing a road condition indicative value ΔH.

In general, the road roughness condition is recognized on the basis of the frequency and amplitude of the road condition indicative signal. The road condition indicative signal includes high-frequency components representative of the vibration of the road wheels and low-frequency components representative of vehicle body vibrations. In the road roughness value derivation process, the instantaneous value H of the road condition indicative signal from the road sensor 16, which is representative of the height of the vehicle above the wheel assembly, is read and used to derive a weighted average value $H_{ave}$. In practice, average value $H_{ave}$ of the road condition indicative signal value H is calculated by updating the previous average with a value derived from the instantaneous road sensor signal value H according to the following equation:

$$H_{ave} = H_{ave0} + 1/64 \cdot (H - H_{ave0})$$

where
$H_{ave0}$ is the average value of the road sensor signal value derived in the immediately preceding cycle of program execution.

Then, the absolute difference value ΔH ($= |H_{ave} - H|$) is calculated. This absolute difference value ΔH serves as the road condition indicative value ΔH to be stored in the register 158. The process of derivation of the road condition indicative value ΔH has been disclosed in detail in the aforementioned co-pending U.S. patent application Ser. No. 751,513. The contents of this U.S. patent application Ser. No. 751,513 are hereby incoporated by reference for the sake of disclosure.

In addition, the controller 100 is connected to a mode selector 170 allowing manual selection of suspension characteristics at least between MANUAL HARD mode, MANUAL SOFT mode and AUTO mode. In the MANUAL HARD mode, the suspension characteristics of the suspension system is fixed at HARD mode. In the MANUAL SOFT mode, the suspension characteristics is fixed at SOFT mode. In the AUTO mode, the suspension characteristics is automatically selected between HARD mode and SOFT mode depending upon the vehicle driving condition. Furthermore, the cxontroller is connected to an up-switch 172 which is manually operable for increasing sensitibity of suspension control parameters for hardening the suspension characteristics, and a down-switch 174 which is manually operable for lowering the sensing ability of the suspension control parameter. The controller 100 is responsive to the command from the mode selector 170, the up-switch 172 and the down switch 172 for adjusting the suspension control characteristics.

In order to select the control items, i.e. roll-suppressive suspension conrtol, anti-squat suspension control, anti-dive suspension control, bouncing responsive suspension control, bottoming suppressive suspension control, vehicle stopping responsive suspension control, the controller 100 in the shown embodiment checks the vehicle driving condition. The controller 100 takes a velocity of steering angle displacement as a rolling-magnitude indicative value $I_a$. The rolling-magnitude indicative value $I_a$ is temporarily stored in a memory block 176 of RAM. Similarly, as a nose-dive magnitude indicative value $I_b$, the brake switch ON/OFF signal is taken. A flag $I_b$ is set in a flag register 178 in response to tuirning On of the brake switch 112. As a squat-mangitude indicative value $I_c$ and a nose-dive magnitude indicative value $I_d$, the fuel pulse width $P_n$ is taken. The squat-magnitude indicative valuve $I_c$ is temperarily stored in a memory block 178 of RAM. As a bottoming magnitude indicative value $I_e$ and a bouncing magnitude indicative value $I_f$, the road sensor signal value is taken. Therefore, the bottoming magnitude indicative value $I_e$ and the bouncing magnitude indicative value $I_f$ are stored in memory blocks 180 and 182 in RAM. Such values indicative of the rolling magnitude, nose-dive magnitude, squat magnitude, bottoming magnitude and bouncing magnitude will be generally referred to as vehicle condition indicative value $I_x$.

So as to select the control item, the controller compares respective vehicle condition indicative values $I_x$ with criteria $Ia_{ref}$, $Ib_{ref}$, $Ic_{ref}$, $Id_{ref}$, $Ie_{ref}$ and $If_{ref}$ stored in respectively associated memory blocks 184, 186, 188, 190, 192 and 194 of ROM. These criteria will be generally referred to as control item selection criteria $Ix_{ref}$.

CPU of the microprocessor executes the suspension control program stored in the program memory block 118. The execution of the aforementioned programs will be described later with reference to FIG. 18.

Figure 18:
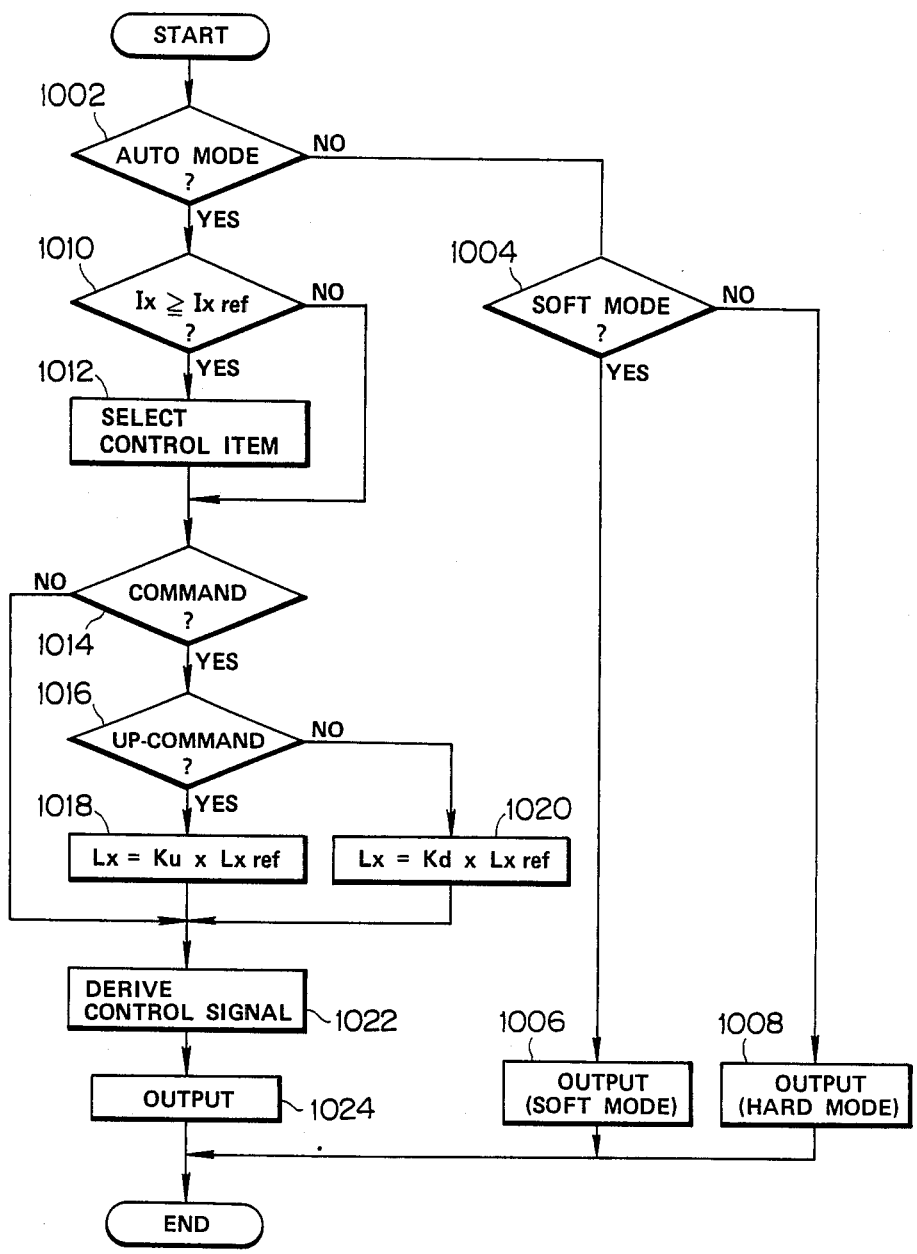
FIG. 18 is a flowchart showing the operation of the second embodiment of the suspension control system of FIG. 17.

FIG. 18 show a suspension control program to be executed by CPU in the controller of FIG. 17. The suspension control program of FIG. 17 is cyclically executed with a given interval. For instance, the suspension control program will be executed every 20 msec.

At first, the mode selector command from the mode selector 170 is checked at a step 1002 to check whether the AUTO mode is selected or not. When the mode selector command orders MANUAL HARD mode or MANUAL SOFT mode, the mode selector command is again checked at a step 1004 to check whether the mode selector command orders the manual SOFT mode. If the result of checking at the step 1004 is YES, then, the control signal ordering SOFT mode is output at a step 1006. On the other hand, when the mode selector command orders MANUAL HARD mode, then process goes to a step 1008 to output the control signal ordering HARD mode.

On the other hand, when the selected mode is AUTO mode as checked at a step 1002, each of the vehicle condition indicative values $I_x$ are compared with the corresponding criteria $Ix_{ref}$, at a step 1010. When one of the values $I_a$, $I_b$, $I_c$, $I_d$, $I_e$ and $I_f$ is greater than the corresponding criteria $Ia_{ref}$, $Ib_{ref}$, $Ic_{ref}$, $Id_{ref}$, $Ie_{ref}$ and $If_{ref}$, the control item corresponding to the vehicle condition indicative value exceeding the corresponding criterion is selected at a step 1012.

After selecting the control item at the step 1012, commands from the up-switch 172 and the down-switch 174 are checked at steps 1014 and 1016. When the command from the up-switch 172 is detected at the step 1014, then the reference value $Lx_{ref}$ to be compared with the corresponding control parameter, i.e. steering angular displacement, fuel injection pulse width, road condition indicative value indicated in the road sensor signal and so forth, is reduced at a predetermined rate $K_u$, at a step 1018. On the other hand, when the command from the down-switch 174 is detected at the step 1016, then the reference value $Lx_{ref}$ to be compared with the corresponding control parameter is increased at a predetermined rate $K_d$, at a step 1020.

In order to increase the reference value or reference values, the shown embodiment of the suspension control system employs various patterns. The following table show an example of adjusting patterns of the reference signals when the up-switch 172 is depressed and the braking responsive anti-dive control is selected in the step 1012.

TABLE

|           | A | B | C | D | E | F |
|-----------|---|---|---|---|---|---|
| PATTERN 1 | 0 | a | 0 | 0 | 0 | 0 |
| PATTERN 2 | b | a | b | b | 0 | 0 |
| PATTERN 3 | b | a | b | b | b | b |
| PATTERN 4 | b | a | b | b | c | c |

In the above table, A is the roll criterion indicative reference value increasing rate, B is the braking responsive nose-dive criterion increasing rate, C is a anti-squat criterion increasing rate, D is deceleration dependent anti-dive criterion increasing rate, E is bottoming responsive criterion increasing rate and F is bouncing responsive criterion increasing rate. Furthermore, the a is a constant smaller than 1, b is a constant smaller than the constant a, c is a constant smaller than the constant b but greater than 0. The PATTERN 1 to 4 will be selected manually by the driver or automatically selected according to a predetermined schedule according to the vehicle driving condition. The rate $K_u$ is derived by subtracting the constant from a the preset rate K. Therefore, when the PATTERN 1 is selected, the braking responsive anti-dive criterion is decreased by multiplying the predetermined value K with a coefficent $K_u$ ($K \times (1-a)$). At the same time, the criteria other than the braking responsive anti-dive criterion is multiplied with a coefficient $K_u$ ($K \times (1-0)$). On the other hand, when the PATTERN 2 is selected, the braking responsive anti-dive criterion is decreased by multiplying the predetermined value K with a coefficent $K_u$ ($K \times (1-a)$). In the PATTERN 2, the roll criterion, the anti-squat criterion, deceleration responsive anti-dive criterion anti-criterion are adjusted by multiplying with coefficient $K_u$ ($K \times (1-b)$). At the same time, the bottoming criterion and bouncing criterion are multiplied with a coefficient $K_u$ ($K \times (1-0)$).

When the PATTERN 3 is selected, the braking responsive anti-dive criterion is decreased by multiplying the predetermined value K with a coefficent $K_u$ ($K \times (1-a)$). At the same time, the criteria other than the braking responsive anti-dive criterion is multiplied with a coefficient $K_u$ ($K \times (1-b)$). On the other hand, when the PATTERN 4 is selected, the braking responsive anti-dive criterion is decreased by multiplying the predetermined value K with a coefficent $K_u$ ($K \times (1-a)$). In the PATTERN 2, the roll criterion, the anti-scout criterion, deceleration responsive anti-dive criterion are adjusted by multiplying with coefficient $K_u$ ($K \times (1-b)$). At the same time, the bottoming criterion and bouncing criterion are multiplied with a coefficient $K_u$ ($K \times (1-c)$).

It should be appreciated when depression of the down-switch 174 is detected at the step 1016, then the suspension control criteria set forth above will be increased with taking the PATTERNS 1 to 4 similarly to that discussed above.

After the process in the step 1018 or 1020, or when none of the commands from the up-switch 172 and the down-switch 174 is detected as checked at the steps 1014 and 1016, derivation of the control signal based on the control parameters and associated reference signals is performed at a step 1022. In the process at the step 1022, each control paramter is compared with the corresponding reference signal value to check whether the vehicle condition requires HARD mode suspension characteristics or not. The control signal derived at the step 1022 is output at a step 1024.

After the process at the step 1006, 1008 or 1024, program goes END.

Figure 19:
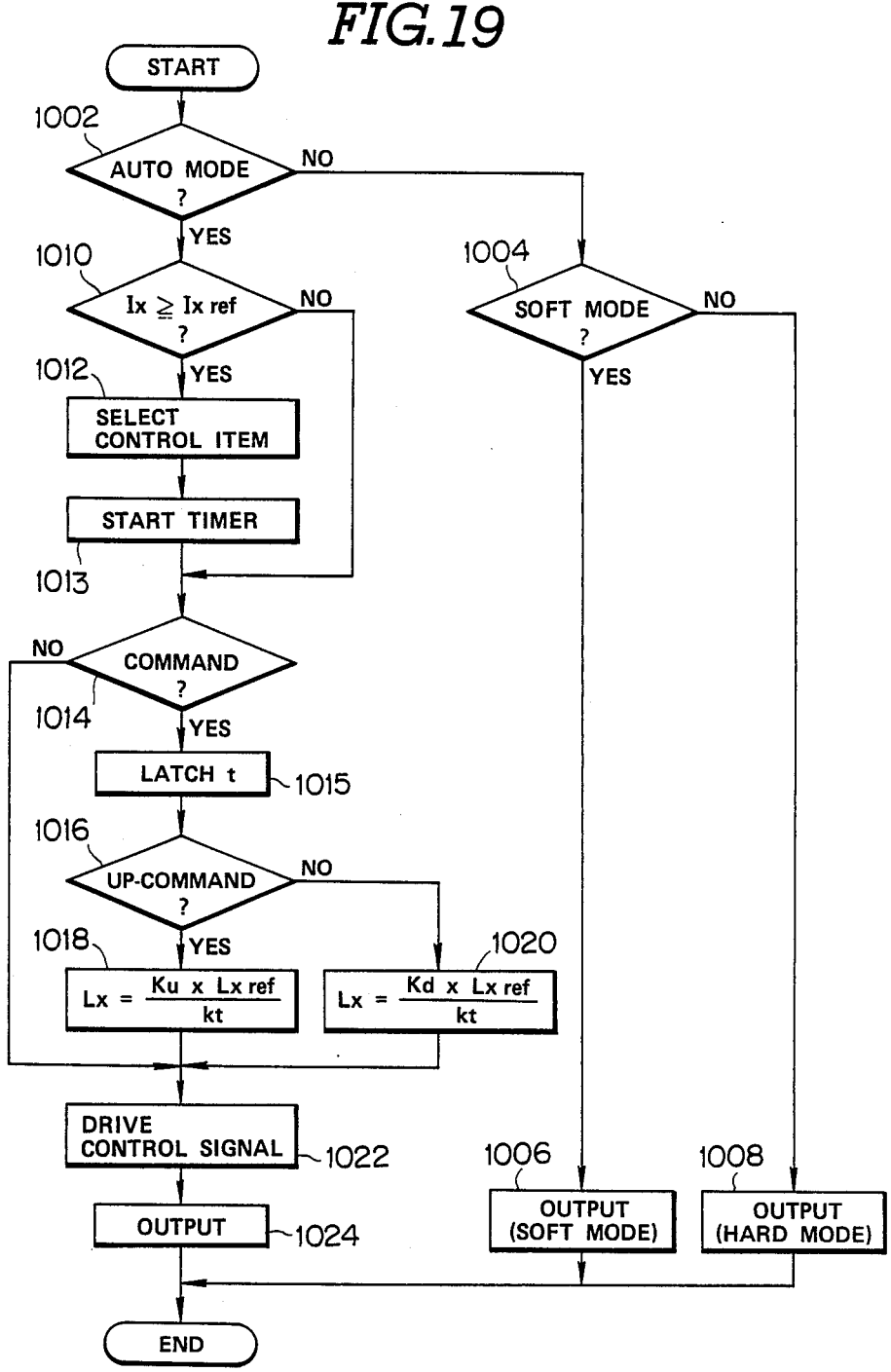
FIG. 19 is a flowchart showing a modified operation of the second embodiment of the suspension control system.

FIG. 19 shows a modified suspension control program modified from the program of FIG. 18. In this modified program, an elapsed time from detection of the control item to be adjusted the criterion is taken into account for deriving the coefficient to be used for adjustment of the crieterion. For this purpose, a timer 160 is provided for counting clock pulses.

At a step 1013 inserted between the steps 1012 and 1014, the timer is reset and restarted to count the clock pulse. Counting of the clock pulse is continued until the command from either the up-switch 172 or the down-switch 174 is detected. When the command from one of the up-switch 172 and the down-switch 174 is detected at the step 1014, then a function kt is derived based on the timer value t at a step 1015. In the step 1015, the timer value is latched. Derivation of the fuction kt can be performed by arithmetic operation to derive the function as a function of the timer value. On the other hand, the function kt can be derived by looking up a table set in ROM with respect to the timer value.

In the adjustment of the criteria in the steps 1018 and 1020, the coefficient $K_u$ is divided by the function kt.

Here the function kt decreases as increasing of the timer value. Therefore, longer elapsed time as measured by the timer results in smaller rate of adjustment of the criteria. Namely, when the up-switch 172 or the down-switch 174 is decreased with a short elapsed time after the control item is selected at the step 1012, it means the degree of dissatisfaction of the driver with respect to the current control characteristics is high. Therefore, in such case, greater change has to be required for fitting the suspension control characteristics to the driver's feeling.

Therefore, by employing the elaspsed time dependent feature in adjustment of the control characteristics, adjustment of the control characteristics can be taken place in more quick manner than that in FIG. 18.

Though the preferred embodiments have disclosed with respect to suspension control with adjustment of the suspension characteristics by adjusting the damping characteristics of the shock absorber, similar effect can be obtained by adjusting stiffness of a roll stabilizer or pneumatic suspension spring.

Although the shown embodiments employ a kind of potentiometer for monitoring relative displacement between the vehicle body and the road wheel, any kind or type of sensor suitable for monitoring road surface roughness may be employed in the shown embodiments of the suspension control system.

What is claimed is:

1. An automotive suspension control system comprising:
   a suspension system having suspension characteristics variable at least between a first harder suspension mode and a second softer suspension mode;
   a sensor means for monitoring a preselected suspension control parameter and producing a sensor signal indicative of the monitored control parameter;
   a controller means for comparing said control parameter indicative sensor signal value with a reference value and for deriving a control signal based on a difference between said control parameter indicative sensor signal and said reference value for operating said suspension system into first and second suspension mode, according to a predetermined suspension control characteristic; and a manual switch means connected to said controller for modifying said reference value so as to adjust the sensing ability of said suspension control system with respect to said control parameter.

2. An automotive suspension control system as set forth in claim 1, wherein said reference value is indicative of a harder suspension criterion and said controller means operates said suspension from said second suspension mode to said first suspension when said sensor signal value increases across said reference value, and further wherein said manual switch means modifies said harder suspension criterion to alter the sensor signal value at which said suspension is operated from said second suspension mode to said first suspension mode when said sensor signal value increases across said reference value.

3. An automotive suspension control system as set forth in claim 1, wherein said suspension control parameter and said reference value are selected such that said controller means performs at least one of anti-roll suspension control, anti-dive suspension control, anti-squat suspension control, bouncing suppressive suspension control and bottoming suppressive suspension control.

4. An automotive suspension control system as set forth in claim 1, wherein said reference value is indicative of a harder suspension criterion and said manual switch means comprises a first switch for decreasing said harder suspension criterion to increase the sensing ability of said suspension control system and a second switch for increasing said harder suspension criterion to decrease said sensing ability of said suspension control system.

5. A system, comprising:
a suspension system having suspension characteristics which are variable at least between a first harder suspension mode and a second softer suspension mode;
a first sensor for monitoring a preselected first suspension control parameter to produce a first sensor signal, which first suspension control parameter represents preselected first vehicular driving condition affecting at least one of vehicular driving stability and driver comfort;
a second sensor for monitoring a preselected second suspension control parameter to produce a second sensor signal, said second sensor control parameter being different from said first suspension control parameter and represents a preselected second vehicular driving condition affecting at least one of vehicular driving stability and driver comfort;
a controller receiving said first and second sensor signals and deriving a control signal for operating said suspension system into one of said first and second suspension modes based on said first and second sensor signals, according to predetermined first and second suspension control characteristics which are derived with respect to respective first and second suspension control parameters;
a manually operable adjusting means for selecting one of said first and second suspension control characteristics and for modifying the selected one of said first and second suspension control characteristics for adjusting the sensing ability of said suspension control system with respect to at least one of said first and second control parameters corresponding to said selected one of said first and second suspension control characteristics.

6. An automotive suspension control system comprising:
a suspension system having suspension characteristics which are variable at least between a first harder suspension mode and a second softer suspension mode;
a first sensor for monitoring a preselected first suspension control parameter to produce a first sensor signal;
a second sensor for monitoring a preselected second suspension control parameter to produce a second sensor signal;
a controller receiving said first and second sensor signals and deriving a control signal for operating said suspension system to one of said first and second suspension modes based on said first and second sensor signals, according to predetermined first and second suspension control characteristics which are derived with respect to respective first and second suspension control parameters;
a manually operable adjusting means for selecting one of said first and second suspension control characteristics for modifying the selected one of said first and second suspension control characteristics to adjust the sensing ability of said suspension control system with respect to at least one of said first and second control parameters corresponding to said selected one of said first and second suspension control characteristics.

7. An automotive suspension control system as set forth in claim 6, wherein said manually operable adjusting means includes first means for identifying a vehicle condition based on an occurence of an operation of said suspension system to said first suspension mode in relation to said respective first and second suspension control parameters, and selecting one of said first and second suspension control characteristics to be modified based on said vehicle condition, and a second means for modifying the selected one of said first and second suspension control characteristics.

8. An automotive suspension control system as set forth in claim 6, wherein the selected one of said first and second suspension control characteristics is a harder suspension criterion and said manually operable adjusting means modifies said harder suspension criterion so that said control signal is derived based on one of said first and second sensor signals according to said modified harder suspension criterion.

9. An automotive suspension control system as set forth in claim 8, wherein said controller compares said first and second sensor signal values with said harder suspension criterion for deriving said control signal to operate said suspension into said first suspension mode when at least one of said first and second sensor signal values is greater than said harder suspension criterion.

10. An automotive suspension control system as set forth in claim 6, wherein the selected one of said first and second suspension control characteristics is a harder suspension criterion and said manually operable adjusting means comprises a first switch for decreasing said harder suspension criterion to increase the sensing ability of said suspension control system, and a second switch for increasing the harder suspension criterion to decrease the sensing ability of said suspension control system.

11. An automotive suspension control system as set forth in claim 6, wherein each of said suspension control parameters relate to at least one of anti-roll suspension control, anti-dive suspension control, anti-squat suspension control, bouncing suppressive suspension control and bottoming suppressive suspension control.

12. A system, comprising:
a suspension system having suspension characteristics which are variable at least between a first harder suspension mode and a second softer suspension mode;
a sensor means for monitoring a preselected suspension control parameter and producing a control parameter indicative sensor signal indicative of the monitored control parameter;
a controller means for comparing said control parameter indicative sensor signal value with a reference value which represents a harder suspension criterion, operating the suspension system into said first mode when said control parameter indicative sensor signal is greater than said reference value, and operating said suspension system into said second mode when said control parameter indicative sensor signal value is smaller than said reference value; and
a manual switch means connected to said controller for accepting manual adjustments for modifying said reference value so as to adjust suspension control system sensitivity with respect to said control parameter.

* * * * *